(12) United States Patent
Klassen et al.

(10) Patent No.: US 12,379,303 B2
(45) Date of Patent: Aug. 5, 2025

(54) CLAMPS FOR APPLYING AN IMMOBILIZING FORCE TO A PHOTODETECTOR, AND SYSTEMS AND METHODS FOR USING THE SAME

(71) Applicant: Becton, Dickinson and Company, Franklin Lakes, NJ (US)

(72) Inventors: Andrew Klassen, San Jose, CA (US); Jason Bradley Ersepke, San Jose, CA (US)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 289 days.

(21) Appl. No.: 17/714,584

(22) Filed: Apr. 6, 2022

(65) Prior Publication Data
US 2022/0397513 A1 Dec. 15, 2022

Related U.S. Application Data

(60) Provisional application No. 63/210,390, filed on Jun. 14, 2021.

(51) Int. Cl.
| | |
|---|---|
| *G01N 15/1434* | (2024.01) |
| *G01J 3/02* | (2006.01) |
| *G01N 15/1492* | (2024.01) |
| *G01N 21/01* | (2006.01) |

(52) U.S. Cl.
CPC ........ *G01N 15/1434* (2013.01); *G01J 3/0202* (2013.01); *G01N 15/1436* (2013.01); *G01N 15/1492* (2024.01); *G01N 21/01* (2013.01); *G01N 2021/0112* (2013.01); *G01N 2201/0225* (2013.01); *G01N 2201/0228* (2013.01)

(58) Field of Classification Search
CPC ......................... G01N 15/1434; G01J 3/0202
See application file for complete search history.

(56) References Cited

U.S. PATENT DOCUMENTS

| | | | |
|---|---|---|---|
| 3,973,118 A * | 8/1976 | LaMontagne | G01J 3/0256 250/208.6 |
| 7,092,083 B2 | 8/2006 | Chadwick et al. | |
| 8,742,325 B1 | 6/2014 | Droz et al. | |
| 11,002,607 B2 * | 5/2021 | Marinsek | G01J 5/0806 |
| 11,519,855 B2 * | 12/2022 | Black | G01N 21/39 |
| 2003/0021310 A1 * | 1/2003 | Harding | H01L 23/4093 372/36 |

(Continued)

FOREIGN PATENT DOCUMENTS

| | | |
|---|---|---|
| CN | 208984754 U | 6/2019 |
| CN | 209045525 U | 6/2019 |

(Continued)

*Primary Examiner* — Rufus L Phillips
(74) *Attorney, Agent, or Firm* — Melissa L. Nakamoto; Bret E. Field; BOZICEVIC, FIELD & FRANCIS LLP

(57) ABSTRACT

Photodetector clamps are provided. Clamps of interest include one or more flexure arms for applying an immobilizing force to one or more photodetectors positioned within a light detection module, and are configured to be positioned on top of a detector block. In embodiments, the bottom of the one or more flexure arms include an opening for contacting the photodetector(s). Light detection modules, systems and methods employing the subject clamps are also provided.

20 Claims, 15 Drawing Sheets

(56) References Cited

U.S. PATENT DOCUMENTS

| | | | |
|---|---|---|---|
| 2005/0200847 A1* | 9/2005 | Chen | G01J 3/36 |
| | | | 356/419 |
| 2013/0230913 A1* | 9/2013 | Florescu | G01N 21/17 |
| | | | 422/69 |
| 2014/0248656 A1* | 9/2014 | Demirci | G01N 33/6893 |
| | | | 435/308.1 |
| 2014/0264082 A1 | 9/2014 | Ayliffe | |
| 2015/0102212 A1* | 4/2015 | Ruh | H01L 31/0203 |
| | | | 250/237 R |
| 2016/0058934 A1 | 3/2016 | Strohhofer et al. | |
| 2016/0223393 A1* | 8/2016 | Hsu | G01J 9/0246 |
| 2016/0282175 A1* | 9/2016 | Skeete | H01L 27/14618 |
| 2016/0284525 A1 | 9/2016 | Katzinger et al. | |
| 2018/0024040 A1 | 1/2018 | Yan et al. | |
| 2018/0128746 A1* | 5/2018 | Zhang | G01N 21/51 |
| 2020/0160688 A1* | 5/2020 | Shimadzu | G01N 21/01 |
| 2020/0353150 A1 | 11/2020 | Barrett et al. | |
| 2024/0027457 A1* | 1/2024 | Chang | G01N 33/57426 |

FOREIGN PATENT DOCUMENTS

| | | |
|---|---|---|
| CN | 212540319 | 2/2021 |
| CN | 212963942 U | 4/2021 |
| EP | 1256315 A1 | 11/2002 |
| EP | 1285206 A1 | 2/2003 |
| RO | 127132 A2 | 2/2012 |
| WO | WO2012068416 A1 | 5/2012 |

* cited by examiner

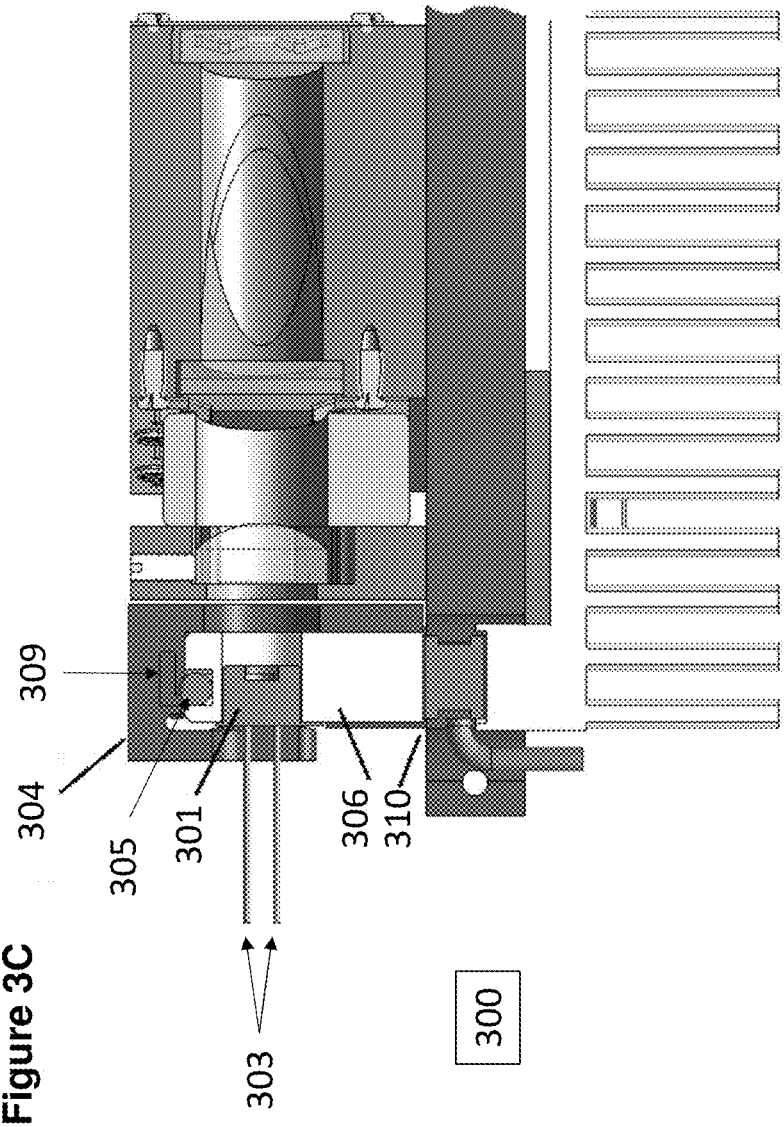

CLAMPS FOR APPLYING AN IMMOBILIZING FORCE TO A PHOTODETECTOR, AND SYSTEMS AND METHODS FOR USING THE SAME

CROSS-REFERENCE TO RELATED APPLICATIONS

Pursuant to 35 U.S.C. § 119 (e), this application claims priority to the filing date of U.S. Provisional Patent Application Ser. No. 63/210,390 filed Jun. 14, 2021; the disclosure of which application is incorporated herein by reference in their entirety.

INTRODUCTION

The characterization of analytes in biological fluids has become an important part of biological research, medical diagnoses and assessments of overall health and wellness of a patient. Detecting analytes in biological fluids, such as human blood or blood derived products, can provide results that may play a role in determining a treatment protocol of a patient having a variety of disease conditions.

Particle analysis (e.g., flow cytometry) is a technique used to characterize and often times sort biological material, such as cells of a blood sample or particles of interest in another type of biological or chemical sample. A flow cytometer typically includes a sample reservoir for receiving a fluid sample, such as a blood sample, and a sheath reservoir containing a sheath fluid. The flow cytometer transports the particles (including cells) in the fluid sample as a cell stream to a flow cell, while also directing the sheath fluid to the flow cell. To characterize the components of the flow stream, the flow stream is irradiated with light. Variations in the materials in the flow stream, such as morphologies or the presence of fluorescent labels, may cause variations in the observed light and these variations allow for characterization and separation. To characterize the components in the flow stream, light must impinge on the flow stream and be collected. Light sources in flow cytometers can vary and may include one or more broad spectrum lamps, light emitting diodes as well as single wavelength lasers. The light source is aligned with the flow stream and an optical response from the illuminated particles is collected and quantified.

The parameters measured using a particle analyzer typically include light at the excitation wavelength scattered by the particle in a narrow angle along a mostly forward direction, referred to as forward-scatter (FSC), the excitation light that is scattered by the particle in an orthogonal direction to the excitation laser, referred to as side-scatter (SSC), and the light emitted from fluorescent molecules or fluorescent dye. Different cell types can be identified by their light scatter characteristics and fluorescence emissions resulting from labeling various cell proteins or other constituents with fluorescent dye-labeled antibodies or other fluorescent probes. Forward-scattered light, side-scattered light and fluorescent light is detected by photodetectors that are positioned within the particle analyzer.

In order to reduce unwanted noise in collected signal, photodetectors are often arranged such that they remain immobile with respect to other components of the particle analyzer. For example, prior solutions for securing photodetectors have included the application of pressure to the sides of a photodetector's cylindrical wall. Because excessive force applied directly to the photodetector in such solutions can cause deformation, the magnitude of the securing force must be appropriately low, thereby permitting some amount of photodetector movement. Conventional approaches have also employed optical adhesives to the cylindrical wall of the photodetector in order to secure said photodetector. In such approaches, a risk must be managed with respect to the accidental application of adhesive to optical surfaces that may damage optical components or compromise the signal received therefrom.

Additional prior solutions have employed a plate for securing photodetectors by providing a force that presses the lips of the photodetectors into a detector block. FIG. 1A-B depicts such a photodetector-securing plate. As shown in FIG. 1A, plate 101 possesses holes through which photodetector leads 103 connect to respective photodetectors. Plate 101 is secured to detector block 102 via screws. As shown in FIG. 1B, presenting an alternative view of the prior solution, photodetector 104 is positioned in block 102 and has leads 103 emitting therefrom. Plate 101 presses on the lips of photodetector 104 and thereby prevents the photodetector from shifting position. In order to install the plate, however, the detector leads must be adjusted. In other words, the leads must be disconnected from a relevant electronic component (e.g., printed circuit board), threaded through the plate, and reconnected. Such adjustment renders the fragile leads vulnerable to damage and misalignment.

SUMMARY

Because conventional approaches for securing photodetectors (i.e., such as those described above and depicted in FIG. 1A-B) contribute to the damage and misalignment of photodetectors and/or photodetector leads, the inventors have realized that devices, systems and methods for immobilizing a photodetector are required. Embodiments of the invention satisfy this and other needs.

Aspects of the invention include clamps having a flexure arm for applying an immobilizing force to a photodetector positioned within a light detection module. In certain cases, the flexure arm is configured to apply the immobilizing force to a lip component of the photodetector. The flexure arm, in some instances, may include a u-shaped opening and a raised portion on an inner surface. In some embodiments, the clamp includes a plurality of flexure arms, such as where the number of flexure arms in the plurality of flexure arms ranges from 2 to 6. Aspects of the subject clamps may additionally include a flexure tab positioned on an inner surface of the clamp for applying an immobilizing force to an elongated electrical component (e.g., a thermistor). In some cases, the clamp includes one or more apertures configured to allow the passage of light through a wall of the clamp for detection. Clamps of interest may further include an attachment mechanism for securing the clamp to the light detection module. The attachment mechanism may include, for example, a passage configured to receive a screw, or one or more clips. Some embodiments of the subject clamps also include an alignment key for positioning the clamp onto the light detection module by engaging in a mating relationship with a recess in the light detection module. Clamps may be manufactured from any convenient material, such as where the clamps include a 3D printed polymer or an injection-moldable polymer.

Aspects of the invention additionally include light detection modules having immobilized photodetectors. Light detection modules of interest include a detection block having a photodetector as well as a clamp fitted on top of the detection block. Clamps that may be employed in the subject light detection modules include a flexure arm for applying an immobilizing force configured to immobilize the photodetector relative to the detection block, where the bottom of the flexure arm includes an opening for contacting the photodetector. Photodetectors of interest in the detection block include, for example, photomultiplier tubes and photodiodes (e.g., avalanche photodiodes). Any convenient number of photodetectors may be included in the subject light detection modules. In some embodiments, the detection block includes a single photodetector. In other embodiments, the detection block includes a plurality of photodetectors, such as where the number of photodetectors in the plurality of photodetectors ranges from 2 to 6. Light detection modules of interest additionally include one or more optical components configured to convey light having a predetermined sub-spectral range for detection. Where the light detection modules include a plurality of optical components, the optical components may be arranged, for example, along a single plane or two or more parallel planes. In embodiments, light detection modules include a plurality of photodetectors and optical components configured to convey light having a predetermined sub-spectral range to the photodetectors. Methods of assembling a light detection module are also provided.

Elements of the disclosure additionally involve systems (e.g., flow cytometric systems) for analyzing a particle. Systems of interest include a light source and a light detection module. Light detection modules for use in the subject systems include a detection block having a photodetector and a clamp fitted on top of the detection block, where the clamp includes a flexure arm for applying an immobilizing force configured to immobilize the photodetector relative to the detection block, and the bottom of the flexure arm includes an opening for contacting the photodetector. Any convenient number of light detection modules may be included in the subject systems. In some embodiments, systems include a single light detection module. In other embodiments, systems include a plurality of light detection modules, such as where the number of light detection modules ranges from 2 to 8, including from 2 to 6. Systems of interest may additionally include one or more wavelength separators. In certain instances, the wavelength separators are prisms or diffraction gratings. In some embodiments, systems include three or more wavelength separators that are each configured to pass light having a predetermined spectral range and one or more light detection modules in optical communication with each wavelength separator having a plurality of photodetectors and an optical component that conveys light having a predetermined sub-spectral range to the photodetectors. Methods of analyzing a sample in a particle analysis system are also provided.

BRIEF DESCRIPTION OF THE FIGURES

The invention may be best understood from the following detailed description when read in conjunction with the accompanying drawings. Included in the drawings are the following figures:

FIG. 3A-C depicts a light detection module and its constituent components according to certain embodiments.

DETAILED DESCRIPTION

Figure 1B:
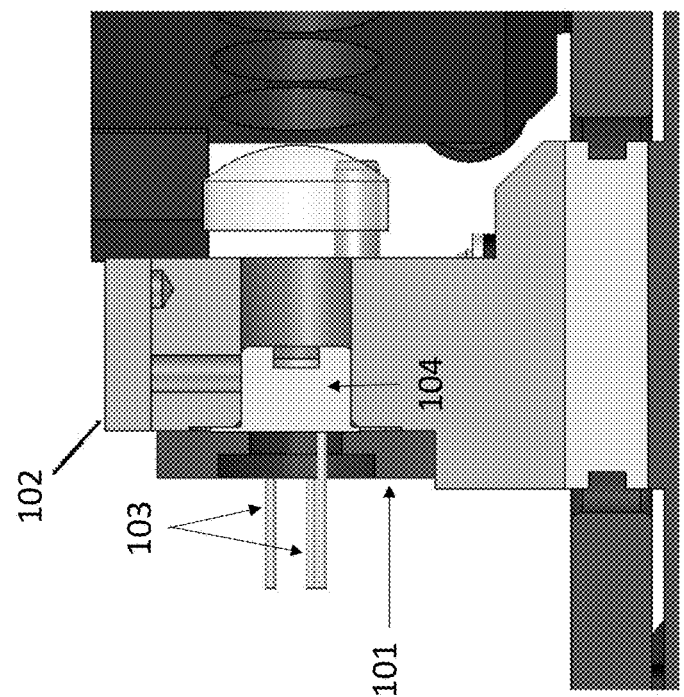
FIG. 1A-B depicts a conventional apparatus for retaining a photodetector.
Figure 1A:
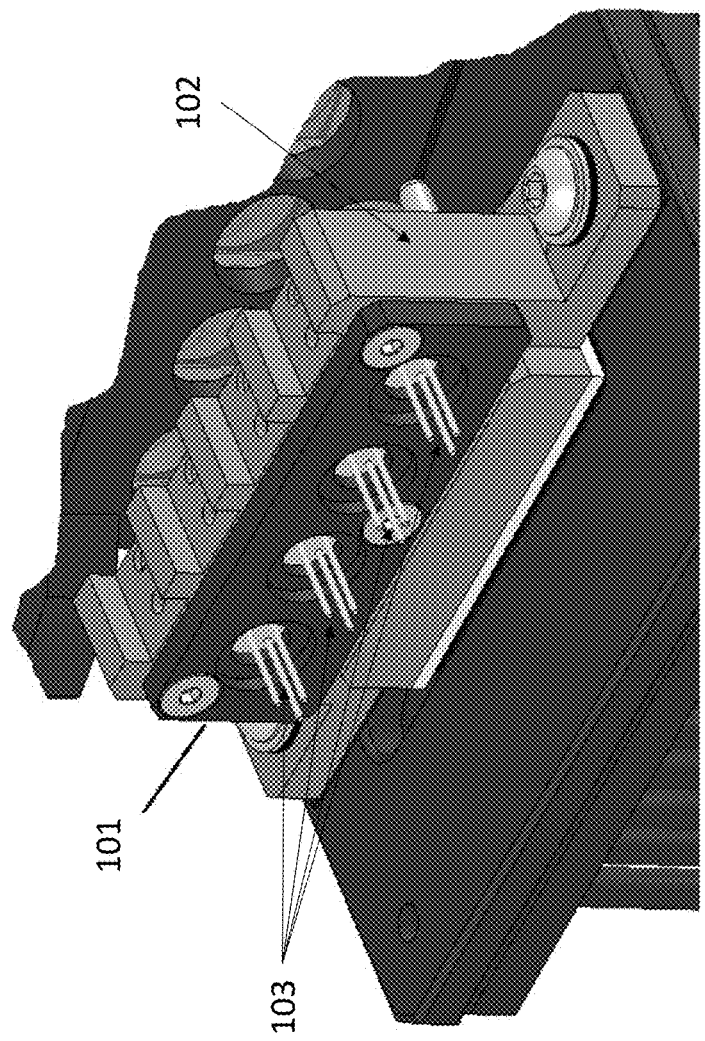

Photodetector clamps are provided. Clamps of interest include one or more flexure arms for applying an immobilizing force to one or more photodetectors positioned within a light detection module, and are configured to be positioned on top of a detector block. In embodiments, the bottom of the one or more flexure arms include an opening for contacting the photodetector(s). Light detection modules, systems and methods employing the subject clamps are also provided.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the system and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

Clamps for Applying an Immobilizing Force to a Photodetector

As discussed above, aspects of the disclosure include clamps for applying an immobilizing force to a photodetector. By "immobilizing force" it is meant a force that is sufficient to prevent the photodetector(s) from altering position with respect to surrounding optical components. Put another way, the subject immobilizing force secures the photodetector(s) within the particle analyzer. In some embodiments, the immobilizing force described herein is sufficient to prevent the position of the photodetector(s) relative to surrounding optical components from varying by 0.25 μm or more, such as 0.5 μm or more, such as 0.75 μm or more, such as 1 μm or more, such as 1.25 μm or more and including 1.5 μm or more. In certain cases, the immobilizing force is sufficient to prevent the position of the photodetector(s) relative to surrounding optical components from varying by 1 μm or more.

Aspects of the subject clamps include one or more flexure arms for applying the immobilizing force to the photodetector(s). As described herein, a "flexure arm" refers to an arm of the clamp configured apply the immobilizing force via elastic body deformation. In other words, the flexure arm applies the immobilizing force after being deformed from its original shape following the positioning of the clamp on a detector block containing the photodetector(s). By "elastic body deformation" it is meant the ability of a deformed body to return to its original shape after the cause of deformation is removed. As such, the flexure arm is configured to "flex" out of its original shape and exert the immobilizing force as a result of the proclivity of the flexure arm to return to its original state. In certain embodiments, the movement of the flexure arm may be characterized by certain degrees of freedom. "Degrees of freedom" are discussed in their conventional sense to refer to the number of independent variables required to define the position of a rigid body. In certain cases, the subject flexure arm operates within a single degree of freedom. In such cases, the elastically deformed flexure arm is configured to flex outwards in a single direction, for example, a direction that is substantially (i.e., to a greater or lesser degree) orthogonal with respect to the surface of the photodetector lips. Following deformation, the flexure arm applies the immobilizing force in a direction that is opposite relative to the direction of flexure, i.e., such that the immobilizing force is applied to the lips of the photodetector.

Embodiments of the subject clamps further include an opening in the flexure arm for contacting the photodetector. In certain cases, the opening is positioned at a bottom portion of the flexure arm. The opening may possess any convenient shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. In some instances, the opening is a u-shaped opening. In some instances, a portion of the flexure arm that surrounds the opening may be configured to apply the immobilizing force to the photodetector (e.g., a lip component of the photodetector). The opening, in some cases, is configured to accommodate photodetector leads without requiring the adjustment of said leads. For example, where the opening is a u-shaped opening, the subject clamp may be positioned over the top of the photodetector and the leads attached to the photodetector are received into a space created by the u-shaped opening as the clamp slides into place.

Clamps according to certain embodiments of the invention additionally include a raised portion on an inner surface of the flexure arm. The raised portion of the flexure arm, in such embodiments, includes material of greater thickness with respect to the remainder of the flexure arm. In some cases where the flexure arm includes an opening, clamps of interest may include a raised portion that surrounds the opening (e.g., surrounding a u-shaped opening). As such, the raised portion may be positioned along the flexure arm such that the raised portion interfaces with the photodetector (e.g., a lip component of the photodetector) when the clamp is applied to a detector block. When the raised portion interfaces with the photodetector, the immobilizing force is applied to the photodetector thereby securing the photodetector to the detector block. The raised portion may possess any convenient shape, where shapes of interest include, but are not limited to: rectilinear cross sectional shapes, e.g., squares, rectangles, trapezoids, triangles, hexagons, etc., curvilinear shapes, e.g., circles, ovals, as well as irregular shapes, e.g., a parabolic bottom portion coupled to a planar top portion. In some embodiments, the raised portion is ramp-shaped. In such embodiments, the material thickness of the raised portion may gradually (e.g., in a more or less constant manner) increase throughout a length of the flexure arm (i.e., from a top region to the bottom). In other embodiments, the raised portion is cone-shaped. In such embodiments, the bottom of the flexure arm may include a side having a wide base (i.e., opposite the photodetector-interfacing side) and a second photodetector-interfacing side culminating in a comparatively narrow point for applying the immobilizing force to the photodetector (e.g., a lip component of the photodetector). In additional embodiments, the raised portion includes a raised edge. In such embodiments, only edge portions of the flexure arm, such as those immediately adjacent to the opening (e.g., a u-shaped opening) are raised, while the remainder of the flexure arm possesses a comparatively lower thickness. The flexure arms described herein may be of any convenient length. In some embodiments, the flexure arms possess a length ranging from 5 mm to 75 mm, such as 5 mm to 75 mm, and including 5 mm to 50 mm.

The clamps described herein may include any convenient number of flexure arms. In certain cases, such as where it is desirable to apply an immobilizing force to a single photodetector, the subject clamp may include a single flexure arm. In other cases, the clamp includes a plurality of flexure arms. For example, the number of flexure arms in the plurality of flexure arms may range from 2 to 8, such as 2 to 6, and including 2 to 4. In certain instances, the clamp includes 4 flexure arms. Where the clamp includes a plurality of flexure arms, the characteristics of each flexure arm may be either the same or different. In one example where the clamp includes 2 flexure arms, the first flexure arm may include a ramp-shaped raised portion, while the second flexure arm does not possess a raised portion. In another example, the first flexure arm possesses a cone-shaped raised portion while the second flexure arm possesses a raised edge, and so on.

In certain embodiments, clamps of the present disclosure further include a wall. In such embodiments, the wall may be positioned on an opposite side of the clamp relative to the flexure arm(s). The wall may, in some cases, extend in a direction that is substantially (i.e., to a greater or lesser degree) parallel to the flexure arm(s). In embodiments, the wall is configured to contact the opposite side of the detector block as compared to the flexure arm, thereby allowing the clamp to slide over the top of the block and apply the immobilizing force. The length of the wall may be the same or different relative to the length of the one or more flexure arms. In some embodiments, the wall and one are more flexure arms possess equal lengths. In other embodiments, the wall is longer that the one or more flexure arms, such as 1% to 75% longer, such as 10% to 50% longer, and including 20% to 40% longer than the one or more flexure arms.

The wall may, in some instances, include one or more apertures configured to allow the passage of light through the wall of the clamp for detection. In such instances, the aperture may be positioned within the wall such that, when the clamp is slid on the top of the detector block, light may travel through the wall and be detected by one or more photodetectors. Apertures of interest may possess any convenient shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. In certain cases, the subject apertures are circular. Clamps of interest may include any convenient number of apertures. In certain instances, the wall of the clamp includes a single aperture. In other instances, the wall of the clamp may include a plurality of apertures. For example, the number of apertures in the plurality of apertures may range from 2 to 8, such as 2 to 6, and including 2 to 4. In some embodiments, the clamp includes 4 apertures.

Clamps of interest further include a bridge component connecting a top portion of the flexure arm to a top portion of the wall. The bridge may span a distance between the flexure arms and the wall than ranges from for example, 2 mm to 75 mm, such as 2 mm to 75 mm, and including 2 mm to 75 mm.

In certain cases, clamps include a flexure tab positioned on an inner surface for applying an immobilizing force to an elongated electrical component positioned on a detector block. In some embodiments, the flexure tab is positioned on an inner surface of the bridge. Relevant elongated electrical components may include, but are not limited to, thermistors. Where the elongated electrical component runs along the top of the detector block, clamps may include a flexure tab that is positioned on an inner surface of the bridge component. In such cases, the flexure tab may immobilize the elongated electrical component when such is placed between the flexure tab and the inner surface of the bridge component. As such, the flexure tab may be elastically deformable such that the tab may flex out of position and apply an immobilizing force to the elongated electrical component due to the proclivity of the flexure tab to regain its original shape. The flexure tabs described herein may possess any convenient shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. In certain cases, the flexure tab is essentially trapezoidal in shape.

Embodiments of the subject clamps additionally include an attachment mechanism for securing the clamp to a light detection module. By "securing" the clamp, it is meant ensuring that the clamp remains attached to the light detection module and preventing the unintentional disassociation of the clamp from said module. In certain cases, the attachment mechanism includes a passage configured to receive a screw. In such cases, the passage may be positioned at any convenient location along the clamp. For example, the passage may be positioned on the flexure arm, bridge, or wall. In certain instances, the passage is positioned on the bridge. The clamp may include any convenient number of passages. In some embodiments, the clamp includes a single passage. In other embodiments, the clamp includes a plurality of passages, such as where the number of passages ranges from 2 to 6 passages, including 2 to 4 passages. In some embodiments, the clamp includes 2 passages.

In other embodiments, the attachment mechanism includes a clip. Clips of interest may include a protrusion from the clamp that is configured to engage in a mating relationship with a complementarily sized groove in the detection module. Where the clamp includes a clip, the clip may be configured to engage with the groove as the clamp is positioned on the detection module and, once engaged, prevent the clamp from being lifted off the detection module. The subject clamps may include any convenient number of clips. In some instances, the clamps include a single clip configured to mate with a single groove in the detection module. In additional embodiments, the clamp includes a plurality of clips, such as where the number of clips ranges from 2 to 4.

In some embodiments, the subject clamps further include an alignment key. In such embodiments, the alignment key may be configured for positioning the clamp onto the light detection module by engaging in a mating relationship with a recess in the light detection module. Put another way, the alignment key aids the correct positioning of the clamp onto the detection module by sliding into a complementarily shaped recess within the detection module. Once the alignment key fully enters the recess, the clamp is optimally located on the detection module (i.e., such that the flexure arms apply immobilizing force to a correct portion of the photodetectors).

Figure 2B:
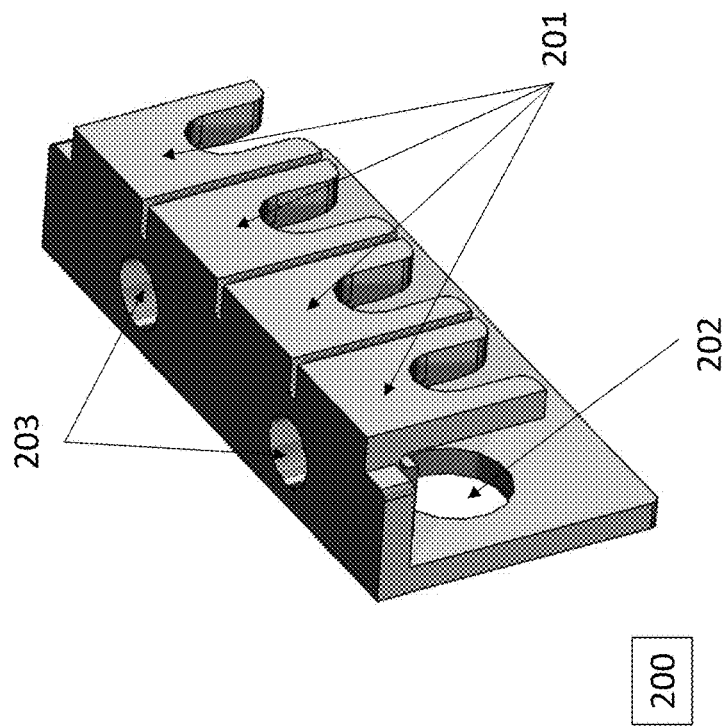
FIG. 2A-E depicts a clamp for immobilizing photodetectors according to certain embodiments.
Figure 2A:
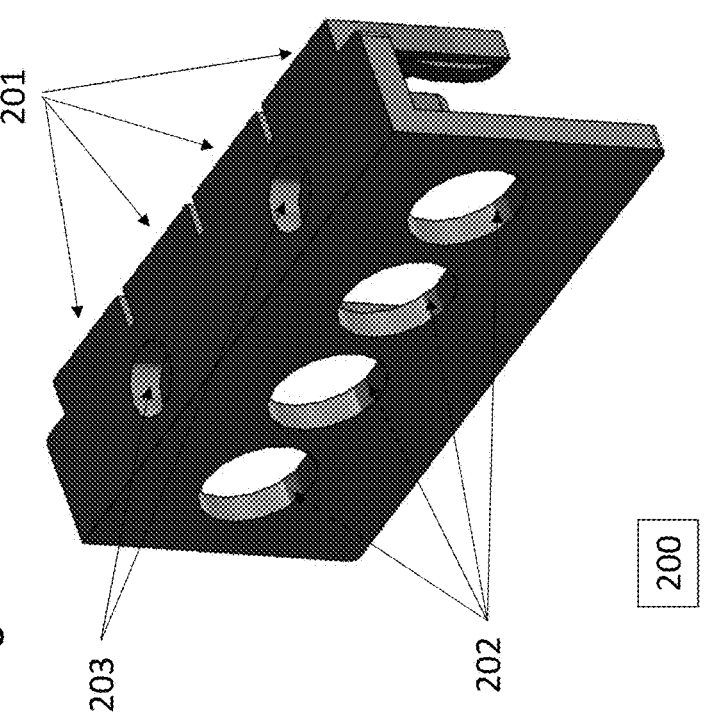
Figure 2D:
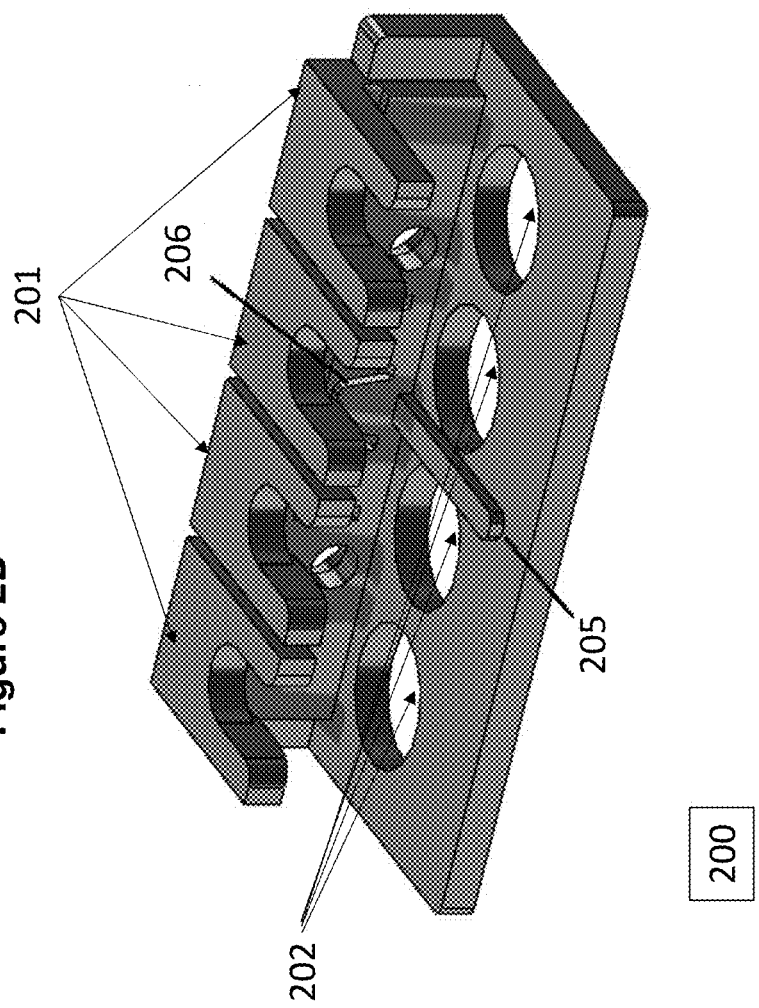
Figure 2C:
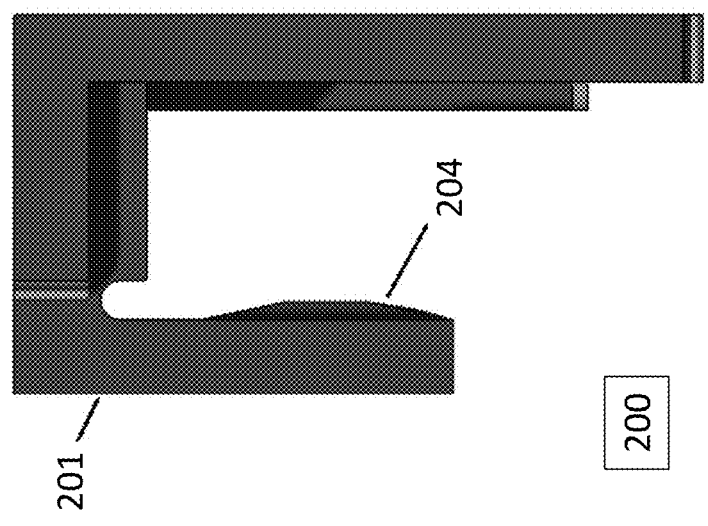
Figure 2E:
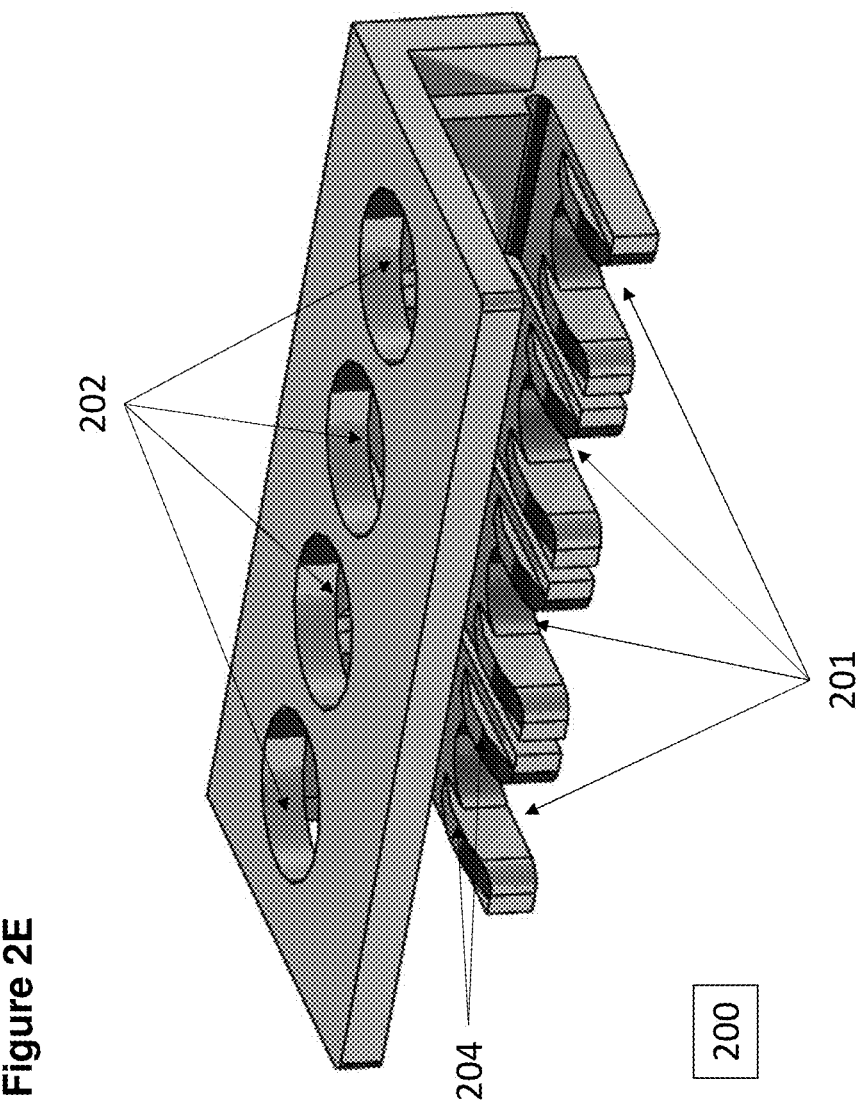

FIG. 2A-E presents alternate views of a clamp according to certain embodiments of the invention. As shown in FIG. 2A, clamp 200 includes 4 flexure arms 201 for applying an immobilizing force to photodetectors (not shown) when clamp 200 is positioned on a light detection module (not shown). Clamp 200 additionally includes apertures 202 for allowing the passage of light for detection, as well attachment mechanisms (passages 203) configured to receive screws for securing the clamp 200 to a light detection module. FIG. 2B presents an alternate view of clamp 200. As shown in FIG. 2B, flexure arms 201 possess u-shaped openings for applying an immobilizing force to a lip component of the photodetector. As shown in FIG. 2C, the flexure arms 201 possess a raised portion 204 on an inner surface. In the example of FIG. 2C, the raised portion 204 possesses an increased material thickness relative to the non-raised portion of flexure arms 201. As shown in FIG. 2D, one embodiment of clamp 200 includes an alignment key 205 located on an inner surface. As clamp 200 is positioned on a detection module, alignment key 205 engages in a mating relationship with a recess in the detection module and thereby ensures that apertures 205 and flexure arms 201 are optimally aligned relative to the photodetectors. In addition, clamp 200 includes a flexure tab 206 positioned on an inner surface for applying an immobilizing force to an elongated electrical component (not shown). FIG. 2E depicts an alternate view of clamp 200 in which flexure arms 201, apertures 202 and raised portions 204 are visible.

The subject clamps may be comprised of any convenient material. In certain instances, clamps include one or more metal components including, for example, aluminum, titanium, brass, iron, lead, nickel, steel (e.g., stainless steel), copper, tin as well as combinations and alloys thereof. In additional embodiments, clamps include one or more rigid plastic materials such as, for example, polycarbonates, polyvinyl chloride (PVC), polyurethanes, polyethers, polyamides, polyimides, among other polymeric plastic materials. In certain cases, the clamp includes a 3D printed polymer. Any convenient 3D printed polymer may be employed, such as, for example, acrylonitrile butadiene styrene (ABS), polylactic acid (PLA), acrylic styrene acrylonitrile (ASA), polyethylene terephthalate (PET), glycol-modified polyethylene terephthalate (PETG), polyaryletherketones (PAEK), polyetherimides (PEI), polypolycarbonate (PC), polypropylene, (PP), nylon as well as composites and hybrids thereof. Examples of suitable 3D printed polymers for use in the present clamps are commercially available under the trade name Ultem®. In some embodiments, the 3D printed polymer includes an epoxy material, such as EPX 82 produced by Carbon, Inc. Suitable 3D printed polymers are also described in U.S. Pat. Nos. 9,676,963; 10,155,882; and 10,350,82, the disclosures of which are incorporated by reference.

In additional embodiments, the clamp includes an injection-moldable polymer. Any convenient injection-moldable polymer may be employed. Injection-moldable polymers may include, but are not limited to: acrylonitrile butadiene styrene (ABS), polycarbonate (PC), aliphatic polyamides (PPA), polyoxymethylene (POM), polymethyl methacrylate (PMMA), polypropylene (PP), polybutylene terephthalate (PBT), polyphenylsulfone (PPSU), polyeteter ether ketone (PEEK) and polyetherimide (PEI).

In some embodiments, the clamp includes a glass-filled polymer (i.e. having glass fibers in a matrix of polymeric material). In such embodiments, any suitable polymer (e.g., such as those described above) may be combined with glass fibers to generate a glass filled polymer. For example, glass filled polymers of interest may include glass-filled nylon or glass-filled polyetherimide.

Light Detection Modules

Aspects of the invention additionally include light detection modules having clamps fitted thereon for applying an immobilizing force to one or more photodetectors positioned within the light detection modules. As discussed herein, a "light detection module" refers to a modular unit possessing one or more photodetectors for detecting certain wavelengths of light. Any convenient photodetector may be employed in the subject light detection modules. Photodetectors of interest may include, but are not limited to, optical sensors or photodetectors, such as active-pixel sensors (APSs), avalanche photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes (PMTs), phototransistors, quantum dot photoconductors or photodiodes and combinations thereof, among other photodetectors. In certain embodiments, the collected light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, the photodetector is a photomultiplier tube. In other embodiments, the photodetector is an avalanche photodiode.

The light detection modules described herein may include any convenient number of photodetectors. In some cases, light detection modules include a single photodetector. In other embodiments, light detection modules include a plurality of photodetectors. For example, the light detection module may include a number of photodetectors ranging from 2 to 8, such as 2 to 6, and including 2 to 4. In some cases, light detection modules of interest include 4 photodetectors. In other cases, light detection modules include 6 photodetectors.

Where the subject light detection modules include a plurality of photodetectors, each photodetectors may be the same, or the plurality of photodetectors may be a combination of different types of photodetector. For example, where the subject light detection modules include two photodetectors, in some embodiments the first photodetector is a CCD-type device and the second photodetector (or imaging sensor) is a CMOS-type device. In other embodiments, both the first and second photodetectors are avalanche photodiodes. In yet other embodiments, both the first and second photodetectors are CMOS-type devices. In still other embodiments, the first photodetector is an avalanche photodiode and the second photodetector is a photomultiplier tube (PMT). In still other embodiments, the first photodetector is a CMOS-type device and the second photodetector is a photomultiplier tube. In yet other embodiments, both the first and second photodetectors are photomultiplier tubes.

Embodiments of the subject light detection modules further include a detection block. Detection blocks of interest are configured to receive one or more photodetectors therein. The detection blocks described herein may be constructed from any convenient material. In some embodiments, detection blocks include a thermally conductive material. In certain embodiments, the thermally conductive material includes a metal, such as copper or aluminum. In certain cases, the detection block is manufactured from copper.

In embodiments, light detection modules include a thermoelectric cooler in contact with a bottom surface of detection block. The term "thermoelectric cooler" is used herein in its conventional sense to refer to a heat pump which transfers heat between the junction of two different surfaces (e.g., a "cool" surface and a "hot" surface) in response to the application of an electrical current. In certain embodiments, heat flux between the two different surfaces is generated by the Peltier effect and thermoelectric coolers of interest are Peltier heat pumps. In some embodiments, the two different surfaces (e.g. plates) of the thermoelectric cooler are formed from different materials (n-type semiconductors, p-type semiconductors), such as narrow band-gap semiconductors and heavy element materials having low thermal conductivity. For example, the surfaces of thermoelectric coolers of interest may be formed from semiconductors such as bismuth telluride, lead telluride, silicon germanium, bismuth-antimony alloys, and combinations thereof. In certain embodiments, thermoelectric coolers of interest include those described in U.S. Patent Publication No. 2004/0155251, U.S. Pat. Nos. 6,499,306; 4,581,898; 4,922,822; 5,409,547 and 2,984,077, the disclosures of which are incorporated herein by reference.

In some instances, the light detection modules described herein further include an elongated electrical component. Elongated electrical components of interest include, for example, thermistors. Thermistors are discussed herein in the conventional sense to refer to a resistor having an electrical resistance that is dependent on temperature. A thermistor may be employed, for example, to monitor the temperature of the light detection module in order to ensure that the module does not overheat during operation of the photodetectors. Where light detection modules include thermistors, the thermistors may be located at any convenient location along the module. For example, in certain cases, light detection modules according to certain embodiments include thermistors running along a top surface of the detection block.

In certain cases, the light detection modules described herein are the light detection modules provided in U.S. application Ser. No. 17/159,453, the disclosure of which is incorporated by reference in its entirety. In such cases, the light detection modules are configured to receive predetermined spectral ranges of light generated by one or more wavelength separators. In embodiments, light detection modules include a plurality of photodetectors and one or more optical components configured to convey light having a predetermined sub-spectral range to the photodetectors. In some embodiments, each optical component is configured to pass light having a sub-spectral range of from 5 nm to 50 nm to each photodetector, such as a sub-spectral range of about 20 nm to each photodetector. The photodetectors and optical components may be positioned in each light detection module along a single plane or along two or more parallel planes. In certain embodiments, the photodetectors and optical components are positioned in a polygonal configuration, such as a hexagonal, heptagonal or octagonal configuration in each light detection module.

As discussed above, the subject light detection modules include a clamp for applying an immobilizing force to the photodetectors positioned therein. Clamps of interest (e.g., such as those described in detail in the preceding section) include one or more flexure arms for applying an immobilizing force to the one or more photodetectors within the detection block of the light detection module. Embodiments of the clamps further include a u-shaped opening for applying the immobilizing force to a lip component of a photodetector. In certain cases, the flexure arm includes a raised portion on an inner surface. In some instances, clamps further include one or more apertures for allowing the passage of light through a wall of the clamp for detection, as well as one or more attachment mechanisms (e.g., passages, clips) for attaching the clamp to the light detection module.

Figure 3B:
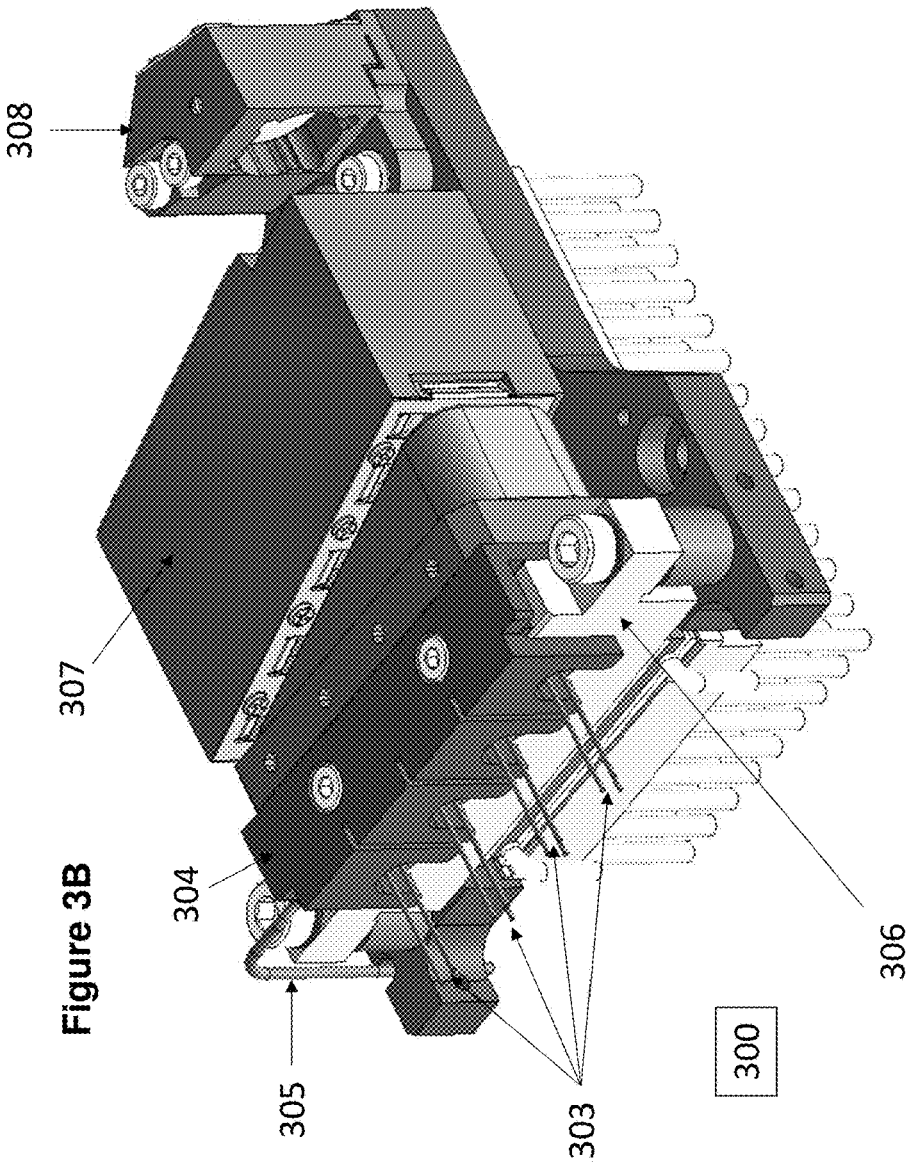
Figure 3A:
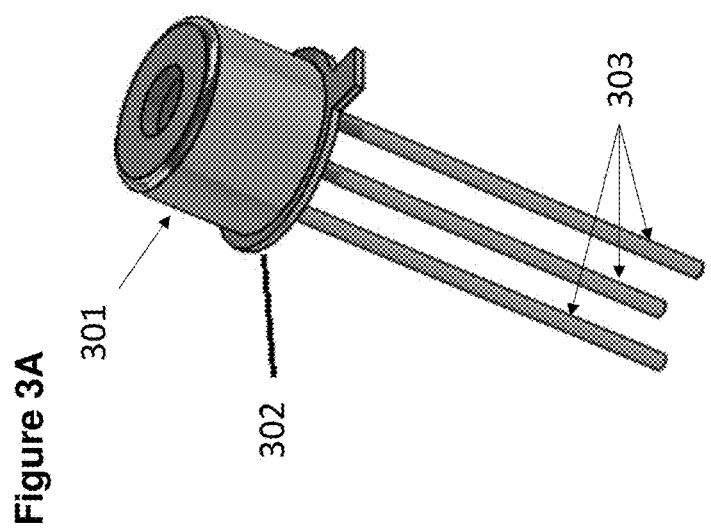

FIG. 3A-C depicts the subject light detection modules as well as their constituent components. FIG. 3A depicts photodetector 301 (i.e., an avalanche photodiode). Photodetector 301 includes lip component 302 upon which immobilizing force may be applied as well as a series of leads 303 propagating from a back side. FIG. 3B depicts light detection module 300 having clamp 304 positioned thereon. As shown in FIG. 3B, clamp 304 slides over the top of detector block 306 so that clamp 304 applies immobilizing force to photodetectors 301 positioned within detector block 306. Leads 303 from photodetectors 301 pass through the u-shaped openings located within the flexure arms of clamp 304. Detector block 306 additionally includes an elongated electrical component 305 (e.g., a thermistor) located on a top portion. In addition to providing immobilizing force to the photodetectors 301, clamp 304 is also configured to apply an immobilizing force to elongated electrical component 305. The detector block is optically connected to housing 307 inside which a series of optical components are positioned. Light detection module 300 is additionally optically connected to wavelength separator 308.

FIG. 3C depicts an alternate view of light detection module 300. As shown in FIG. 3C, detector block 306 includes photodetectors 301 positioned therein. Clamp 304 is positioned on top of detector block 306 and applies an immobilizing force to lip components 302 (shown in FIG. 3A) of photodetectors 301. Leads 303 connected to photodetectors 301 pass through a u-shaped opening positioned within the flexure arms of clamp 304. Detector block 306 also includes an elongated electrical component 305 (e.g., thermistor) running on a top portion. In order to apply an immobilizing force to elongated electrical component 305, clamp 304 additionally includes a flexure tab 309. Also shown is a thermoelectric cooler 310 configured to draw heat from a bottom portion of detector block 306 for dissipation.

Figure 4:
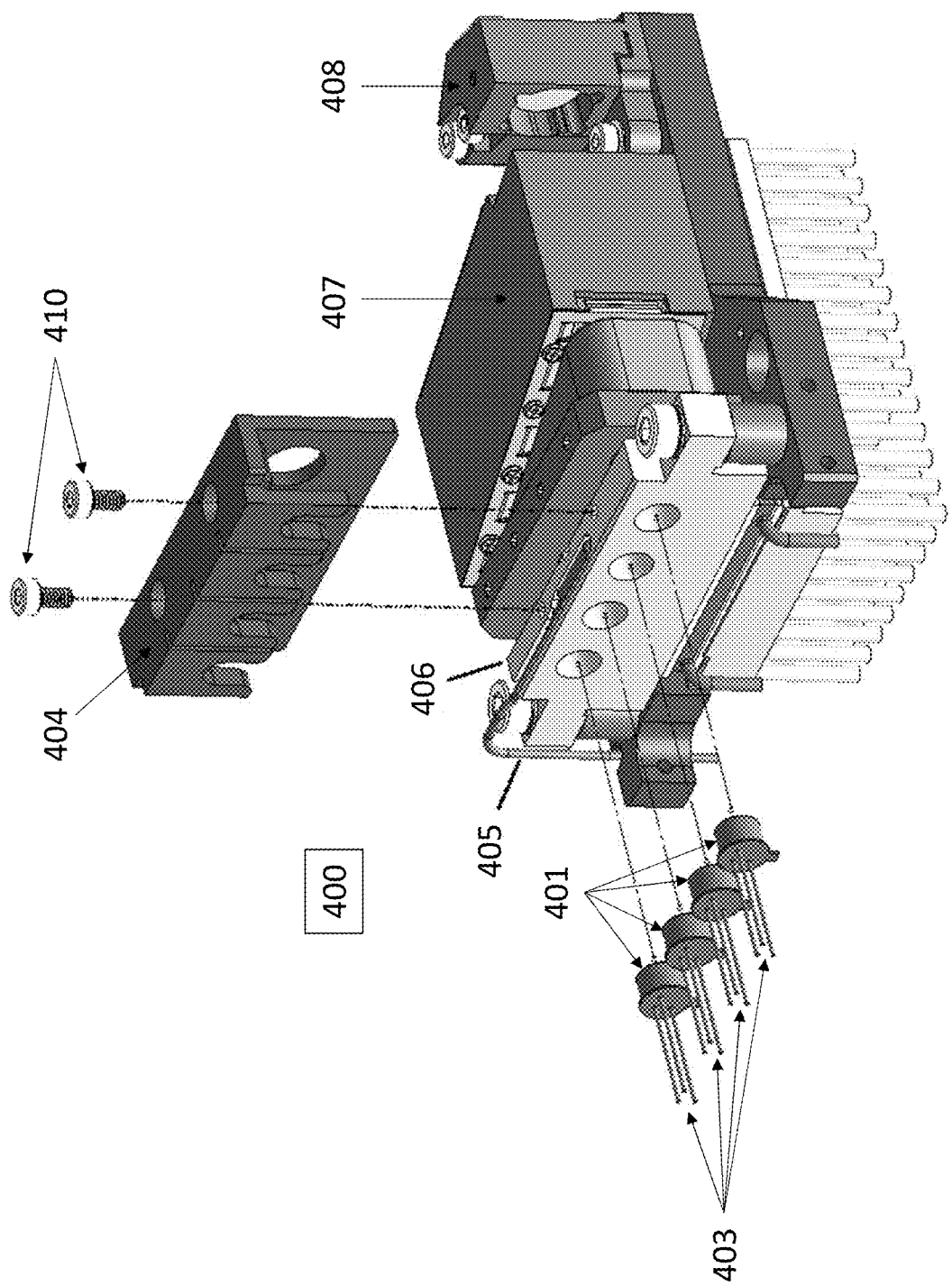
FIG. 4 presents an exploded view of a light detection module having clamps immobilized therein via a clamp according to certain embodiments.

FIG. 4 presents an exploded view of light detection module 400. As shown in FIG. 4, photodetectors 401 having leads 403 emitting therefrom are positioned in correspondingly shaped holes in detector block 406. Clamp 404 is positioned on top of block 406 and applies an immobilizing force to the photodetectors 401 and elongated electrical component 405 (e.g., thermistor). Clamp 404 is secured to block 406 via screws 410. Light detection module 400 additionally includes a housing 407 inside which a series of optical components are positioned. Housing 407 is in optical communication with wavelength separator 408.

In certain cases, the subject light detection modules further include a printed circuit board (PCB). As is known in the art, printed circuit boards electrically connect multiple electronic components via conductive material positioned within a non-conductive substrate. In such cases, one or more components of the light detection module may be in electrical communication with the printed circuit board. For example, in some embodiments, light detection modules are arranged such that photodetector leads are connected to the printed circuit board (e.g., via soldering). Where light detection modules include photodetector leads that are connected to a printed circuit board, the subject clamps may be positioned on top of the light detection block without adjusting the leads (e.g., removing the leads from the printed circuit board). As described above, embodiments of the clamps include an opening (e.g., u-shaped opening) positioned at the bottom of one or more flexure arms for allowing photodetector leads to pass through without adjustment.

Figure 5B:
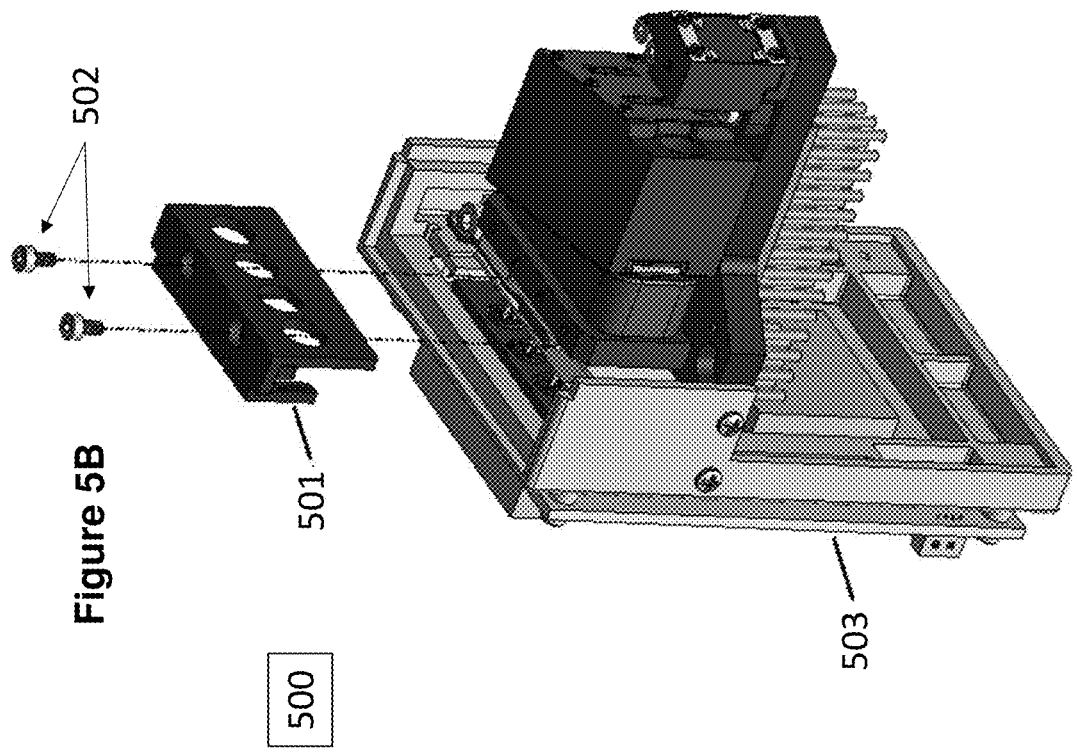
FIG. 5A-B presents an exploded view of a light detection module having a printed circuit board and a clamp according to certain embodiments.
Figure 5A:
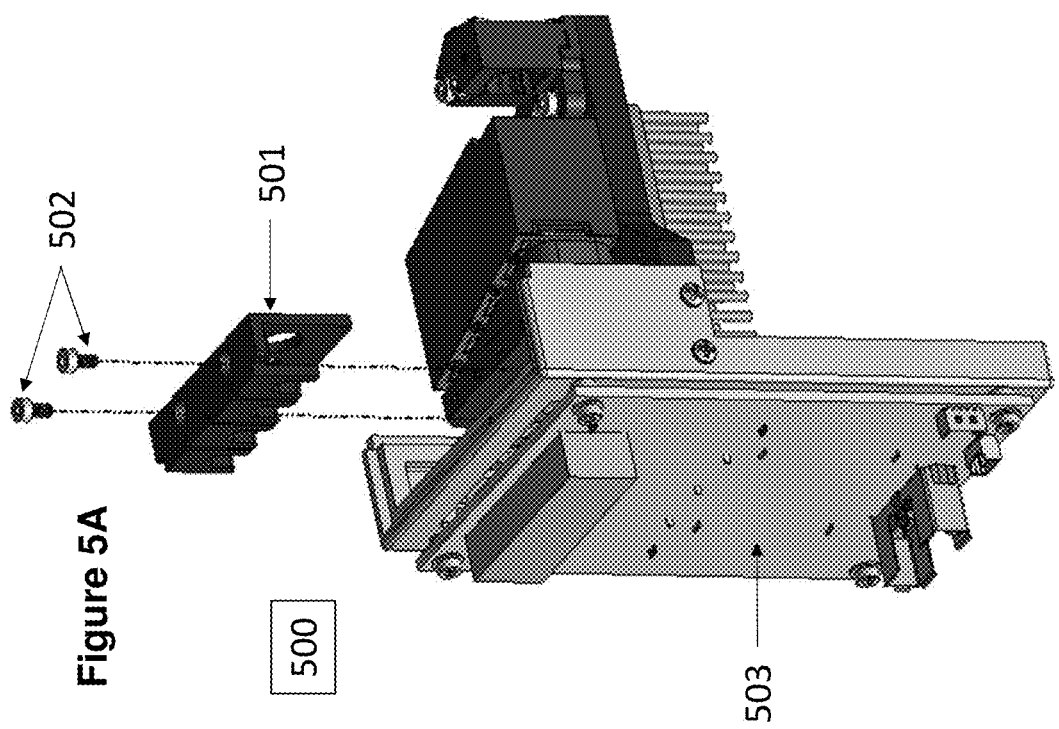

FIG. 5A-B depicts exploded views of a light detection module 500 having a printed circuit board 503. Clamp 501 is secured on light detection module 500 via screws 502. Positioning of clamp 501 on the light detection module 500 does not displace photodetector leads (not shown) connected to printed circuit board 503

As discussed above, in some embodiments, light detection modules include an optical adjustment component (also referred to as an optical component) configured to convey light having a predetermined sub-spectral range to one or more photodetectors. By "optical adjustment" is meant that light is changed or adjusted when conveyed to each photodetector in the light detection module. In some embodiments, optical adjustment includes propagating light having a predetermined sub-spectral range to a photodetector. In some embodiments, each light detection module includes one or more optical adjustment components that are configured to separate light conveyed from the wavelength separator into predetermined sub-spectral ranges by passing light having a predetermined sub-spectral range and reflecting one or more remaining spectral ranges of light. In other embodiments, the optical adjustment component is configured to separate light conveyed from the wavelength separator into predetermined sub-spectral ranges by passing light having a predetermined sub-spectral range and absorbing one or more remaining spectral ranges of light. In yet other embodiments, the optical adjustment component is configured to spatially diffract light conveyed from the wavelength separator into the predetermined sub-spectral ranges. Optical adjustment components may be any convenient light separation protocol, such as one or more dichroic mirrors, bandpass filters, diffraction gratings, beam splitters or prisms. In certain embodiments, optical adjustment components in the light detection modules that are configured to separate light conveyed from the wavelength separator into predetermined sub-spectral ranges are dichroic mirrors.

Depending on the wavelengths of light passed from the wavelength separator to the light detection module (as described above), the one or more optical components in the light detection module may be configured to convey light having wavelengths that range from a first wavelength, Yi (in nanometers, nm) to a second wavelength Yn (in nanometers, nm) to the photodetectors. In some embodiments, the one or more optical components are configured to convey light having wavelengths that range from 100 nm to 1500 nm to the photodetectors, such as from 150 nm to 1450 nm, such as from 200 nm to 1400 nm, such as from 250 nm to 1350 nm, such as from 300 nm to 1300 nm, such as from 350 nm to 1250 nm, such as from 400 nm to 1200 nm, such as from 450 nm to 1150 nm, such as from 500 nm to 1100 nm, such as from 550 nm to 1050 nm and including propagating light having wavelengths that range from 600 nm to 1000 nm to the photodetectors.

In embodiments, the optical components in each light detection module are configured to convey a predetermined sub-spectral range of light, $Y_s$ (in nanometers, nm) to each photodetector. The predetermined sub-spectral ranges conveyed by each optical component may vary, where certain optical components of interest are configured to convey sub-spectral ranges of light that span from 5 nm to 50 nm, such as from 6 nm to 49 nm, such as from 7 nm to 48 nm, such as from 8 nm to 47 nm, such as from 9 nm to 46 nm and including from 10 nm to 45 nm. In certain embodiments, the optical component is configured to pass a spectral range of light that spans 20 nm.

In some embodiments, the optical components in each light detection module are in optical communication with each other, such as being positioned to convey light between each other. The optical components may be oriented with respect to each other in the light detection module (as referenced in an X-Z plane) at an angle ranging from 10° to 180°, such as from 15° to 170°, such as from 20° to 160°, such as from 25° to 150°, such as from 30° to 120° and including from 45° to 90°. In some instances, the optical components are positioned along a single plane. In other instances, the optical components are positioned along more than one plane. For example, the optical components may be positioned along two or more parallel planes, such as three or more, such as four or more and including five or more parallel planes. In certain instances, the optical components are arranged into a geometric configuration, where arrangements of interest include, but are not limited to a square configuration, rectangular configuration, trapezoidal configuration, triangular configuration, hexagonal configuration, heptagonal configuration, octagonal configuration, nonagonal configuration, decagonal configuration, dodecagonal configuration, circular configuration, oval configuration as well as irregular shaped configurations. In certain embodiments, the optical components are arranged in a hexagonal configuration. In other embodiments, the optical components are arranged in a heptagonal configuration.

Figure 6:
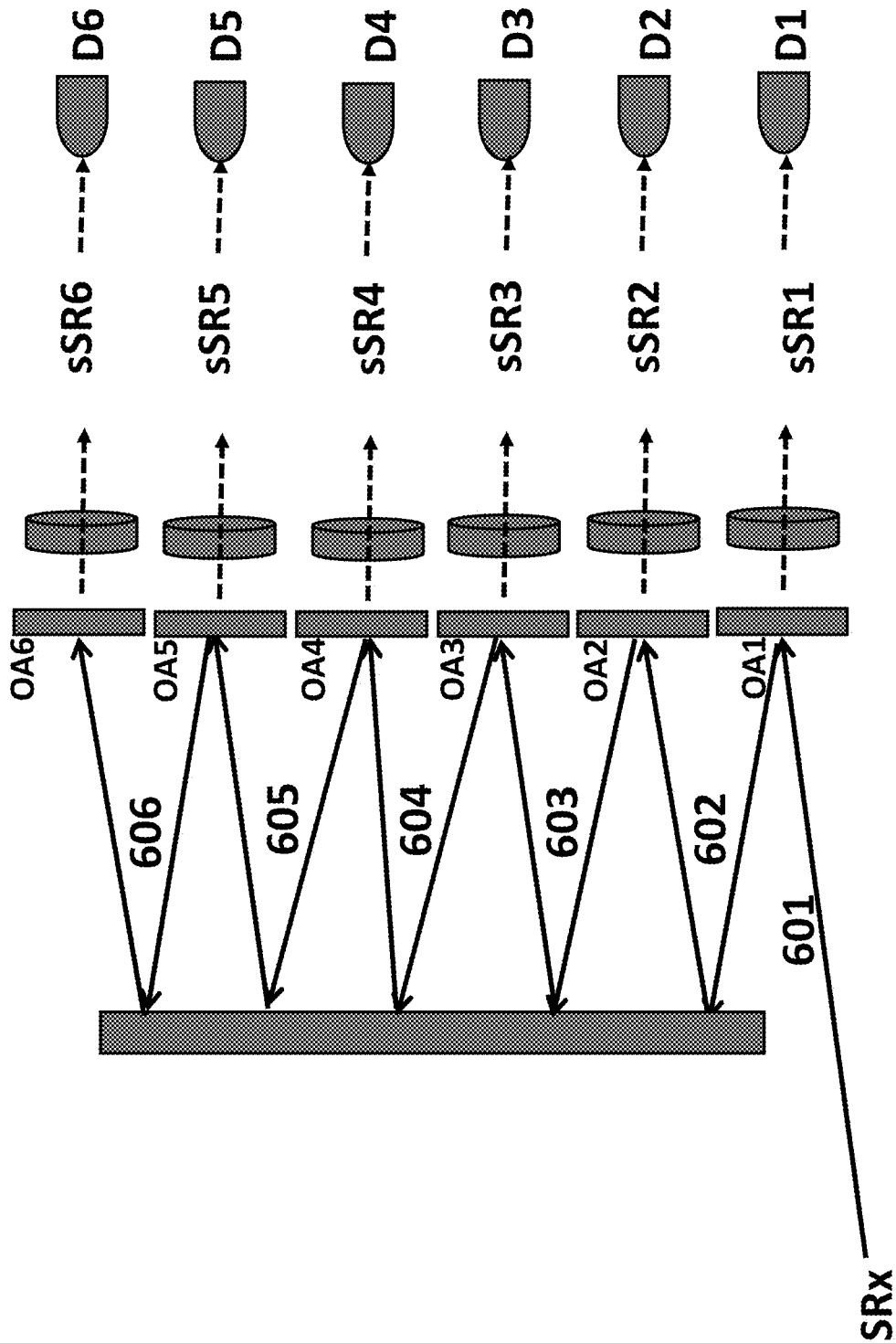
FIG. 6 depicts a schematic diagram of a light detection module according to certain embodiments.

FIG. 6 depicts components of a light detection module positioned along two parallel planes according to certain embodiments. A spectral range of light SRx from a wavelength separator having a set of wavelengths 601 (e.g., 360 nm to 480 nm) is conveyed to a first optical component OA1 configured to pass a first sub-spectral range of light sSR1 (e.g., 360 nm to 380 nm) and convey light having a set of wavelengths 602 (e.g., 380 nm to 480 nm) to a second optical component OA2. The first sub-spectral range of light sSR1 is conveyed to a first photodetector D1. The second optical component OA2 is configured to pass a second sub-spectral range of light sSR2 (e.g., 380 nm to 400 nm) and convey light having a set of wavelengths 603 (e.g., 400 nm to 480 nm) to a third optical component OA3. The second sub-spectral range of light sSR2 is conveyed to a second photodetector D2. The third optical component OA3 is configured to pass a third sub-spectral range of light sSR3 (e.g., 400 nm to 420 nm) and convey light having a set of wavelengths 604 (e.g., 420 nm to 480 nm) to a fourth optical component OA4. The third sub-spectral range of light sSR3 is conveyed to a third photodetector D3. The fourth optical component OA4 is configured to pass a fourth sub-spectral range of light sSR4 (e.g., 420 nm to 440 nm) and convey light having a set of wavelengths 605 (e.g., 440 nm to 480 nm) to a fifth optical component OA5. The fourth sub-spectral range of light sSR4 is conveyed to a fourth photodetector D4. The fifth optical component OA5 is configured to pass a fifth sub-spectral range of light sSR5 (e.g., 440 nm to 460 nm) and convey light having a set of wavelengths 306 (e.g., 460 nm to 480 nm) to a sixth optical component OA6. The fifth sub-spectral range of light sSR5 is conveyed to a fifth photodetector D5. The sixth optical component OA6 is configured to pass a sixth sub-spectral range of light sSR6 (e.g., 460 nm to 480 nm). The sixth sub-spectral range of light sSR6 is conveyed to a sixth photodetector D6. In this embodiment, light is conveyed along a sequential zig-zag light path.

Particle Analysis Systems

Aspects of the invention also include particle analysis systems. Systems of interest include a particle analyzer (e.g., a flow cytometer) having photodetectors that are immobilized by one or more clamps (e.g., as described above). Particle analyzers of interest may include a flow cell for transporting particles in a flow stream and a light source for irradiating the particles in the flow stream at an interrogation point. The subject particle analyzers additionally include one or more photodetectors for detecting particle-modulated light. In embodiments, the particle analyzers include one or more light detection modules (e.g., as described above).

As discussed herein, a "flow cell" is described in its conventional sense to refer to a component, such as a cuvette, containing a flow channel having a liquid flow stream for transporting particles in a sheath fluid. Cuvettes of interest include containers having a passage running therethrough. The flow stream may include a liquid sample injected from a sample tube. Flow cells of interest include a light-accessible flow channel. In some instances, the flow cell includes transparent material (e.g., quartz) that permits the passage of light therethrough. In some embodiments, the flow cell is a stream-in-air flow cell in which light interrogation of the particles occurs outside of the flow cell (i.e., in free space).

In some cases, the flow stream is configured for irradiation with light from a light source at an interrogation point. The flow stream for which the flow channel is configured may include a liquid sample injected from a sample tube. In certain embodiments, the flow stream may include a narrow, rapidly flowing stream of liquid that is arranged such that linearly segregated particles transported therein are separated from each other in a single-file manner. The "interrogation point" discussed herein refers to a region within the flow cell in which the particle is irradiated by light from the light source, e.g., for analysis. The size of the interrogation point may vary as desired. For example, where 0 µm represents the axis of light emitted by the light source, the interrogation point may range from −100 µm to 100 µm, such as −50 µm to 50 µm, such as −25 µm to 40 µm, and including −15 µm to 30 µm.

After particles are irradiated in the flow cell, particle-modulated light may be observed. By "particle-modulated light" it is meant light that is received from the particles in the flow stream following the irradiation of the particles with light from the light source. In some cases, the particle-modulated light is side-scattered light. As discussed herein, side-scattered light refers to light refracted and reflected from the surfaces and internal structures of the particle. In additional embodiments, the particle-modulated light includes forward-scattered light (i.e., light that travels through or around the particle in mostly a forward direction). In still other cases, the particle-modulated light includes fluorescent light (i.e., light emitted from a fluorochrome following irradiation with excitation wavelength light).

As discussed above, aspects of the invention also include a light source configured to irradiate particles passing through the flow cell at an interrogation point. Any convenient light source may be employed as the light source described herein. In some embodiments, the light source is a laser. In embodiments, the laser may be any convenient laser, such as a continuous wave laser. For example, the laser may be a diode laser, such as an ultraviolet diode laser, a visible diode laser and a near-infrared diode laser. In other embodiments, the laser may be a helium-neon (HeNe) laser. In some instances, the laser is a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In other instances, the subject flow cytometers include a dye laser, such as a stilbene, coumarin or rhodamine laser. In yet other instances, lasers of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, the subject flow cytometers include a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof.

Laser light sources according to certain embodiments may also include one or more optical adjustment components. In certain embodiments, the optical adjustment component is located between the light source and the flow cell, and may include any device that is capable of changing the spatial width of irradiation or some other characteristic of irradiation from the light source, such as for example, irradiation direction, wavelength, beam width, beam intensity and focal spot. Optical adjustment protocols may include any convenient device which adjusts one or more characteristics of the light source, including but not limited to lenses, mirrors, filters, fiber optics, wavelength separators, pinholes, slits, collimating protocols and combinations thereof. In certain embodiments, flow cytometers of interest include one or more focusing lenses. The focusing lens, in one example, may be a de-magnifying lens. In still other embodiments, flow cytometers of interest include fiber optics.

Where the optical adjustment component is configured to move, the optical adjustment component may be configured to be moved continuously or in discrete intervals, such as for example in 0.01 µm or greater increments, such as 0.05 µm or greater, such as 0.1 µm or greater, such as 0.5 µm or greater such as 1 µm or greater, such as 10 µm or greater, such as 100 µm or greater, such as 500 µm or greater, such as 1 mm or greater, such as 5 mm or greater, such as 10 mm or greater and including 25 mm or greater increments.

Any displacement protocol may be employed to move the optical adjustment component structures, such as coupled to a moveable support stage or directly with a motor actuated translation stage, leadscrew translation assembly, geared translation device, such as those employing a stepper motor, servo motor, brushless electric motor, brushed DC motor, micro-step drive motor, high resolution stepper motor, among other types of motors.

The light source may be positioned any suitable distance from the flow cell, such as where the light source and the flow cell are separated by 0.005 mm or more, such as 0.01 mm or more, such as 0.05 mm or more, such as 0.1 mm or more, such as 0.5 mm or more, such as 1 mm or more, such as 5 mm or more, such as 10 mm or more, such as 25 mm or more and including at a distance of 100 mm or more. In addition, the light source may be positioned at any suitable angle relative to the flow cell, such as at an angle ranging from 10 degrees to 90 degrees, such as from 15 degrees to 85 degrees, such as from 20 degrees to 80 degrees, such as from 25 degrees to 75 degrees and including from 30 degrees to 60 degrees, for example at a 90 degree angle.

In some embodiments, light sources of interest include a plurality of lasers configured to provide laser light for discrete irradiation of the flow stream, such as 2 lasers or more, such as 3 lasers or more, such as 4 lasers or more, such as 5 lasers or more, such as 10 lasers or more, and including 15 lasers or more configured to provide laser light for discrete irradiation of the flow stream. Depending on the desired wavelengths of light for irradiating the flow stream, each laser may have a specific wavelength that varies from 200 nm to 1500 nm, such as from 250 nm to 1250 nm, such as from 300 nm to 1000 nm, such as from 350 nm to 900 nm and including from 400 nm to 800 nm. In certain embodiments, lasers of interest may include one or more of a 405 nm laser, a 488 nm laser, a 561 nm laser and a 635 nm laser.

In some embodiments, the particle analysis systems described herein are clustered wavelength division (CWD) systems, such as those described in U.S. application Ser. No. 17/159,453, the disclosure of which is incorporated by reference in its entirety. Particle analysis systems according to such embodiments include one or more wavelength separators (e.g., three or more) configured to generate predetermined spectral ranges of light from a light source and one or more (e.g., three or more) light detection modules configured to receive each of the predetermined spectral ranges of light, the light detection modules having a plurality of photodetectors and an optical component that conveys light having a predetermined sub-spectral range to the photodetectors. In embodiments, systems include a plurality of light detection modules, such as where the number of light detection modules in the plurality of light detection modules ranges from 2 to 8, such as 2 to 6. In certain instances, the wavelength separator is a prism or a diffraction grating. In certain embodiments, systems include three or more wavelength separators that are each configured to pass light having a predetermined spectral range and one or more light detection modules in optical communication with each wavelength separator having a plurality of photodetectors and an optical component that conveys light having a predetermined sub-spectral range to the photodetectors. In some embodiments, the wavelength separators are configured to convey light between each other. The wavelength separators may be positioned along a single plane or along two or more parallel planes. In certain embodiments, the wavelength separators are positioned in a polygonal configuration, such as a pentagonal or hexagonal configuration. In embodiments, the wavelength separators are configured to pass light of a predetermined spectral range. In some embodiments, the wavelength separators are configured to pass light having wavelengths that range from 200 nm to 1200 nm, such as from 360 nm to 960 nm. In some embodiments, the wavelength separators are each configured to pass light having a spectral range that spans from 75 nm to 150 nm. In certain instances, the wavelength separators are each configured to pass light having a spectral range that spans 100 nm (e.g., pass light having wavelengths that range from 360 nm to 460 nm).

Particle analysis systems of interest include one or more light detection modules in optical communication with each wavelength separator. In embodiments, each light detection module includes a plurality of photodetectors and an optical component configured to convey light having a predetermined sub-spectral range to the photodetectors. In some embodiments, each optical component is configured to pass light having a sub-spectral range of from 5 nm to 50 nm to each photodetector, such as a sub-spectral range of about 20 nm to each photodetector. The photodetectors and optical components may be positioned in each light detection module along a single plane or along two or more parallel planes. In certain embodiments, the photodetectors and optical components are positioned in a polygonal configuration, such as a hexagonal, heptagonal or octagonal configuration in each light detection module. Light detection modules of interest include a clamp for immobilizing the photodetectors positioned therein (e.g., as described above). Where systems include multiple light detection modules, each module may include a respective clamp.

In some embodiments, light from each wavelength separator is conveyed to each light detection module by an optical collection system. Each optical collection system may be any suitable light collection protocol that collects the spectral range of light passed by the wavelength separator and directs the light to the light detection module. In some embodiments, the optical collection system includes fiber optics, such as a fiber optics light relay bundle. In other embodiments, the optical collection system is a free-space light relay system.

Figure 7:
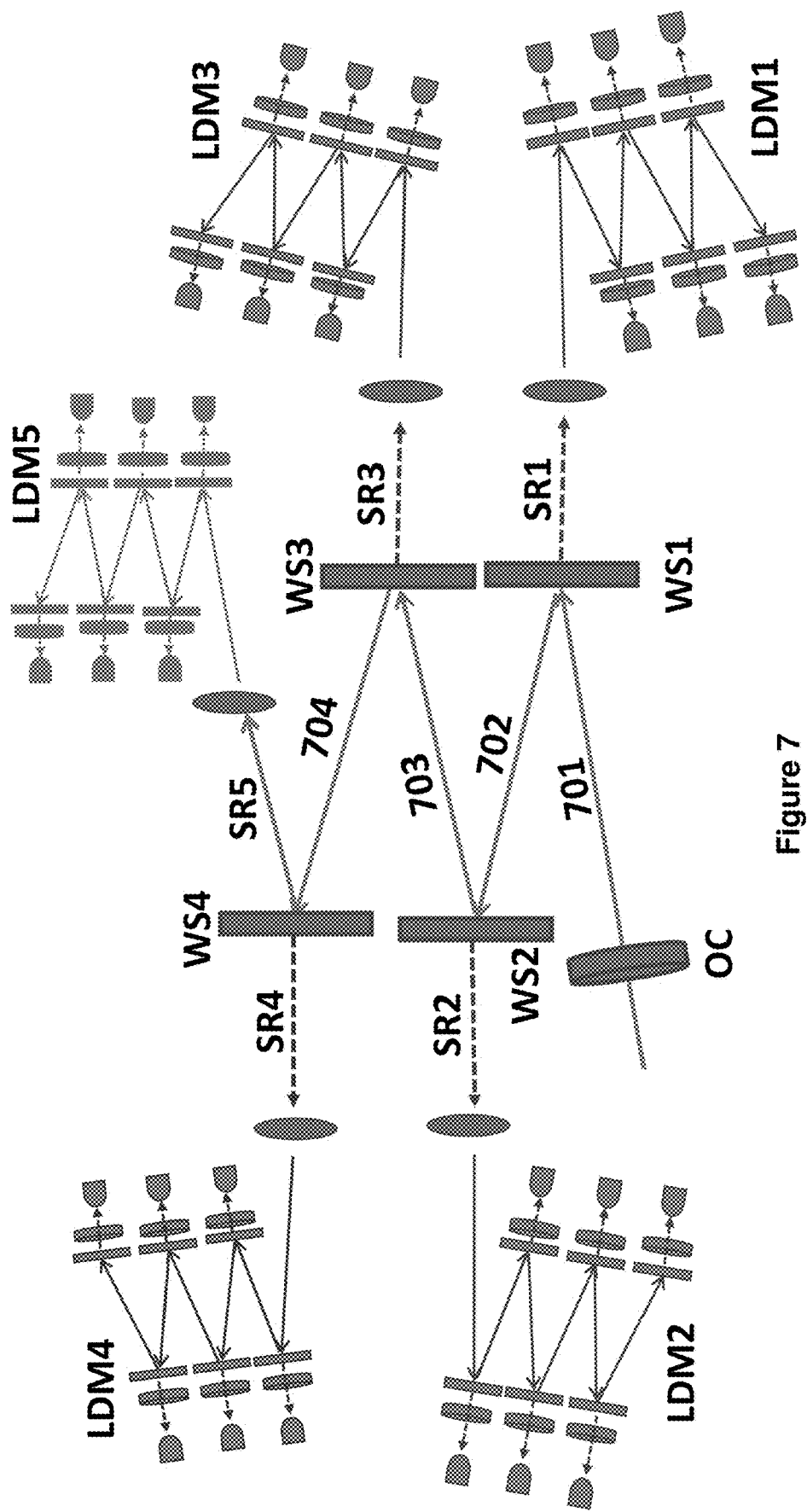
FIG. 7 depicts a schematic diagram of a clustered wavelength division light detection system according to certain embodiments.

FIG. 7 depicts a particle analysis system having a plurality of wavelength separators and light detection modules according to certain embodiments. Light from a sample is conveyed through an optical collection system OC having an optical component configured to pass light having a set of wavelengths 701 to a first wavelength separator WS1 that is configured to pass a first spectral range of light SR1 and convey light having a set of wavelengths 702 to a second wavelength separator WS2. The light of spectral range SR1 is conveyed to a first light detection module LDM1. The second wavelength separator WS2 is configured to pass a second spectral range of light SR2 and convey light having a set of wavelengths 703 to a third wavelength separator WS3. The light of spectral range SR2 is conveyed to a second light detection module LDM2. The third wavelength separator WS3 is configured to pass a third spectral range of light SR3 and convey light having a set of wavelengths 704 to a fourth wavelength separator WS4. The light of spectral range SR3 is conveyed to a third light detection module LDM3. The fourth wavelength separator WS4 is configured to pass a fourth spectral range of light SR4 and convey light having a fifth spectral range of light SR5 to a fifth light detection module LDM5. The light of spectral range SR4 is conveyed to a fourth light detection module LDM4. In this embodiment, each of spectral ranges of light SR1, SR2, SR3, SR4 and SR5 are conveyed to light detection modules, LDM1, LDM2, LDM3, LDM4 and LDM5, respectively, which have a back-and-forth zig-zag configuration as described in FIG. 6 above.

As discussed above, aspects of the subject flow cytometers include a flow cell configured to propagate particles in a flow stream. Any convenient flow cell which propagates a fluidic sample to a sample interrogation region may be employed, where in some embodiments, the flow cell includes is a cylindrical flow cell, a frustoconical flow cell or a flow cell that includes a proximal cylindrical portion defining a longitudinal axis and a distal frustoconical portion which terminates in a flat surface having the orifice that is transverse to the longitudinal axis.

In some embodiments, the sample flow stream emanates from an orifice at the distal end of the flow cell. Depending on the desired characteristics of the flow stream, the flow cell orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. In certain embodiments, flow cell of interest has a circular orifice. The size of the nozzle orifice may vary, in some embodiments ranging from 1 µm to 10000 µm, such as from 25 µm to 7500 µm, such as from 50 µm to 5000 µm, such as from 75 µm to 1000 µm, such as from 100 µm to 750 µm and including from 150 µm to 500 µm. In certain embodiments, the nozzle orifice is 100 µm.

In some embodiments, the flow cell includes a sample injection port configured to provide a sample to the flow cell. The sample injection port may be an orifice positioned in a wall of the inner chamber or may be a conduit positioned at the proximal end of the inner chamber. Where the sample injection port is an orifice positioned in a wall of the inner chamber, the sample injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, etc., as well as irregular shapes, e.g., a parabolic bottom portion coupled to a planar top portion. In certain embodiments, the sample injection port has a circular orifice. The size of the sample injection port orifice may vary depending on shape, in certain instances, having an opening ranging from 0.1 mm to 5.0 mm, such as 0.2 to 3.0 mm, such as 0.5 mm to 2.5 mm, such as from 0.75 mm to 2.25 mm, such as from 1 mm to 2 mm and including from 1.25 mm to 1.75 mm, for example 1.5 mm.

In certain instances, the sample injection port is a conduit positioned at a proximal end of the flow cell inner chamber. For example, the sample injection port may be a conduit positioned to have the orifice of the sample injection port in line with the flow cell orifice. Where the sample injection port is a conduit positioned in line with the flow cell orifice, the cross-sectional shape of the sample injection tube may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The orifice of the conduit may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm. The shape of the tip of the sample injection port may be the same or different from the cross-sectional shape of the sample injection tube. For example, the orifice of the sample injection port may include a beveled tip having a bevel angle ranging from 1 degree to 10 degrees, such as from 2 degrees to 9 degrees, such as from 3 degrees to 8 degrees, such as from 4 degrees to 7 degrees and including a bevel angle of 5 degrees.

In some embodiments, the flow cell also includes a sheath fluid injection port configured to provide a sheath fluid to the flow cell. In embodiments, the sheath fluid injection system is configured to provide a flow of sheath fluid to the flow cell inner chamber, for example in conjunction with the sample to produce a laminated flow stream of sheath fluid surrounding the sample flow stream. Depending on the desired characteristics of the flow stream, the rate of sheath fluid conveyed to the flow cell chamber by the may be 25 µL/sec to 2500 µL/sec, such as 50 µL/sec to 1000 µL/sec, and including 75 µL/sec or more to 750 µL/sec.

In some embodiments, the sheath fluid injection port is an orifice positioned in a wall of the inner chamber. The sheath fluid injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

In some embodiments, systems further include a pump in fluid communication with the flow cell to propagate the flow stream through the flow cell. Any convenient fluid pump protocol may be employed to control the flow of the flow stream through the flow cell. In certain instances, systems include a peristaltic pump, such as a peristaltic pump having a pulse damper. The pump in the subject systems is configured to convey fluid through the flow cell at a rate suitable for multi-photon counting of light from the sample in the flow stream. For example, the system may include a pump that is configured to flow sample through the flow cell at a rate that ranges from 1 nL/min to 500 nL/min, such as from 1 nL/min to 250 nL/min, such as from 1 nL/min to 100 nL/min, such as from 2 nL/min to 90 nL/min, such as from 3 nL/min to 80 nL/min, such as from 4 nL/min to 70 nL/min, such as from 5 nL/min to 60 nL/min and including from 10 nL/min to 50 nL/min. In certain embodiments, the flow rate of the flow stream is from 5 nL/min to 6 nL/min.

Suitable flow cytometry systems may include, but are not limited to those described in Ormerod (ed.), *Flow Cytometry: A Practical Approach*, Oxford Univ. Press (1997); Jaroszeski et al. (eds.), *Flow Cytometry Protocols*, Methods in Molecular Biology No. 91, Humana Press (1997); *Practical Flow Cytometry*, 3rd ed., Wiley-Liss (1995); Virgo, et al. (2012) *Ann Clin Biochem*. January; 49(pt 1):17-28; Linden, et. al., *Semin Throm Hemost*. 2004 October; 30(5): 502-11; Alison, et al. *J Pathol*, 2010 December; 222(4):335-344; and Herbig, et al. (2007) *Crit Rev Ther Drug Carrier Syst*. 24(3):203-255; the disclosures of which are incorporated herein by reference. In certain instances, flow cytometry systems of interest include BD Biosciences FACSCanto™ flow cytometer, BD Biosciences FACSCanto™ II flow cytometer, BD Accuri™ flow cytometer, BD Accuri™ C6 Plus flow cytometer, BD Biosciences FACSCelesta™ flow cytometer, BD Biosciences FACSLyric™ flow cytometer, BD Biosciences FACSVerse™ flow cytometer, BD Biosciences FACSymphony™ flow cytometer, BD Biosciences LSRFortessa™ flow cytometer, BD Biosciences LSRFortessa™ X-20 flow cytometer, BD Biosciences FACSPresto™ flow cytometer, BD Biosciences FACSVia™ flow cytometer and BD Biosciences FACSCalibur™ cell sorter, a BD Biosciences FACSCount™ cell sorter, BD Biosciences FACSLyric™ cell sorter, BD Biosciences Via™ cell sorter, BD Biosciences Influx™ cell sorter, BD Biosciences Jazz™ cell sorter, BD Biosciences Aria™ cell sorter, BD Biosciences FACSAria™ II cell sorter, BD Biosciences FACSAria™ III cell sorter, BD Biosciences FACSAria™ Fusion cell sorter and BD Biosciences FACSMelody™ cell sorter, BD Biosciences FACSymphony™ S6 cell sorter or the like.

In some embodiments, the subject systems are flow cytometric systems, such those described in U.S. Pat. Nos. 10,663,476; 10,620,111; 10,613,017; 10,605,713; 10,585, 031; 10,578,542; 10,578,469; 10,481,074; 10,302,545; 10,145,793; 10,113,967; 10,006,852; 9,952,076; 9,933,341; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039; 4,987,086; 4,498,766; the disclosures of which are herein incorporated by reference in their entirety.

In certain instances, flow cytometry systems of the invention are configured for imaging particles in a flow stream by fluorescence imaging using radiofrequency tagged emission (FIRE), such as those described in Diebold, et al. Nature Photonics Vol. 7(10); 806-810 (2013) as well as described in U.S. Pat. Nos. 9,423,353; 9,784,661; 9,983,132; 10,006,852; 10,078,045; 10,036,699; 10,222,316; 10,288,546; 10,324,019; 10,408,758; 10,451,538; 10,620,111; and U.S. Patent Publication Nos. 2017/0133857; 2017/0328826; 2017/0350803; 2018/0275042; 2019/0376895 and 2019/0376894 the disclosures of which are herein incorporated by reference.

Figure 8:
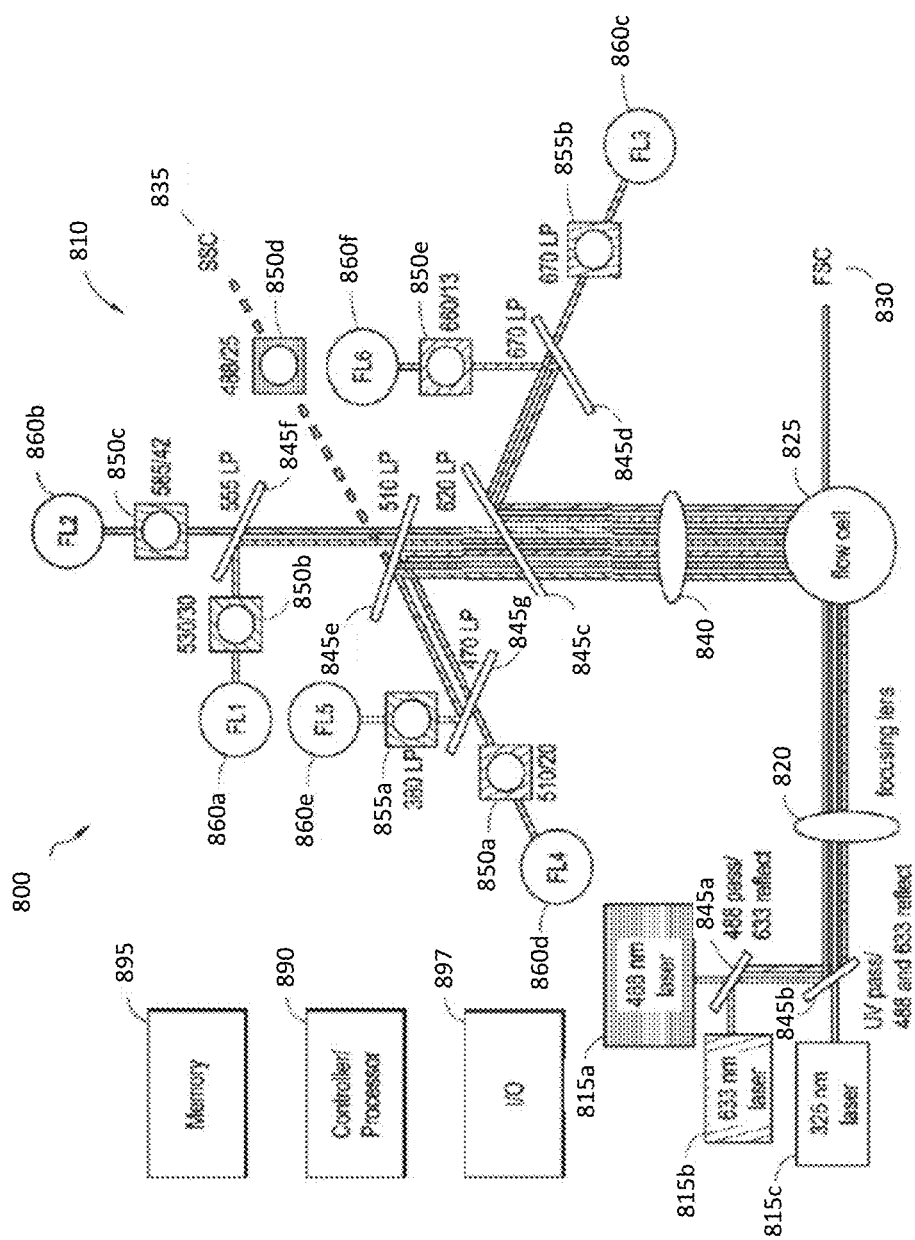
FIG. 8 depicts a functional block diagram of a flow cytometric system according to certain embodiments.

FIG. 8 shows a system 800 for flow cytometry in accordance with an illustrative embodiment of the present invention. The system 800 includes a flow cytometer 810, a controller/processor 890 and a memory 895. The flow cytometer 810 includes one or more excitation lasers 815a-815c, a focusing lens 820, a flow chamber 825, a forward-scatter photodetector 830, a side-scatter photodetector 835, a fluorescence collection lens 840, one or more beam splitters 847a-847g, one or more bandpass filters 850a-850e, one or more longpass ("LP") filters 855a-855b, and one or more fluorescent photodetectors 860a-860f.

The excitation lasers 815a-c emit light in the form of a laser beam. The wavelengths of the laser beams emitted from excitation lasers 815a-815c are 488 nm, 633 nm, and 325 nm, respectively, in the example system of FIG. 8. The laser beams are first directed through one or more of beam splitters 845a and 845b. Beam splitter 845a transmits light at 488 nm and reflects light at 633 nm. Beam splitter 845b transmits UV light (light with a wavelength in the range of 10 to 400 nm) and reflects light at 488 nm and 633 nm.

The laser beams are then directed to a focusing lens 820, which focuses the beams onto the portion of a fluid stream where particles of a sample are located, within the flow chamber 825. The flow chamber is part of a fluidics system which directs particles, typically one at a time, in a stream to the focused laser beam for interrogation. The flow chamber can comprise a flow cell in a benchtop cytometer or a nozzle tip in a stream-in-air cytometer.

The light from the laser beam(s) interacts with the particles in the sample by diffraction, refraction, reflection, scattering, and absorption with re-emission at various different wavelengths depending on the characteristics of the particle such as its size, internal structure, and the presence of one or more fluorescent molecules attached to or naturally present on or in the particle. The fluorescence emissions as well as the diffracted light, refracted light, reflected light, and scattered light may be routed to one or more of the forward-scatter photodetector 830, the side-scatter photodetector 835, and the one or more fluorescent photodetectors 860a-860f through one or more of the beam splitters 845c-845g, the bandpass filters 850a-850e, the longpass filters 855a-855b, and the fluorescence collection lens 840.

The fluorescence collection lens 840 collects light emitted from the particle-laser beam interaction and routes that light towards one or more beam splitters and filters. Bandpass filters, such as bandpass filters 850a-850e, allow a narrow range of wavelengths to pass through the filter. For example, bandpass filter 850a is a 510/20 filter. The first number represents the center of a spectral band. The second number provides a range of the spectral band. Thus, a 510/20 filter extends 10 nm on each side of the center of the spectral band, or from 500 nm to 520 nm. Shortpass filters transmit wavelengths of light equal to or shorter than a specified wavelength. Longpass filters, such as longpass filters 855a-855b, transmit wavelengths of light equal to or longer than a specified wavelength of light. For example, longpass filter 855b, which is a 670 nm longpass filter, transmits light equal to or longer than 670 nm. Filters are often selected to optimize the specificity of a photodetector for a particular fluorescent dye. The filters can be configured so that the spectral band of light transmitted to the photodetector is close to the emission peak of a fluorescent dye.

The forward-scatter photodetector 830 is positioned slightly off axis from the direct beam through the flow cell and is configured to detect diffracted light, the excitation light that travels through or around the particle in mostly a forward direction. The intensity of the light detected by the forward-scatter photodetector is dependent on the overall size of the particle. The forward-scatter photodetector can include a photodiode. The side-scatter photodetector 835 is configured to detect refracted and reflected light from the surfaces and internal structures of the particle that tends to increase with increasing particle complexity of structure. The fluorescence emissions from fluorescent molecules associated with the particle can be detected by the one or more fluorescent photodetectors 860a-860f. The side-scatter photodetector 835 and fluorescent photodetectors can include photomultiplier tubes. The signals detected at the forward-scatter photodetector 830, the side-scatter photodetector 835 and the fluorescent photodetectors can be converted to electronic signals (voltages) by the photodetectors. This data can provide information about the sample.

In certain cases, each individual photodetector in FIG. 8 may be immobilized by a clamp such as those described herein. In other embodiments, a subset of the photodetectors in FIG. 8 are immobilized by a clamp while others are not. In still other embodiments, two or more photodetectors (e.g., 860a-e) may be co-located (e.g., in a light detection module) and a clamp having a plurality of flexure arms is employed to apply an immobilizing force to the co-located photodetectors.

One of skill in the art will recognize that a flow cytometer in accordance with an embodiment of the present invention is not limited to the flow cytometer depicted in FIG. 8, but can include any flow cytometer known in the art. For example, a flow cytometer may have any number of lasers, beam splitters, filters, and photodetectors at various wavelengths and in various different configurations.

In operation, cytometer operation is controlled by a controller/processor 890, and the measurement data from the photodetectors can be stored in the memory 895 and processed by the controller/processor 890. Although not shown explicitly, the controller/processor 890 is coupled to the photodetectors to receive the output signals therefrom, and may also be coupled to electrical and electromechanical components of the flow cytometer 810 to control the lasers, fluid flow parameters, and the like. Input/output (I/O) capabilities 897 may be provided also in the system. The memory 895, controller/processor 890, and I/O 897 may be entirely provided as an integral part of the flow cytometer 810. In such an embodiment, a display may also form part of the I/O capabilities 897 for presenting experimental data to users of the cytometer 810. Alternatively, some or all of the memory 895 and controller/processor 890 and I/O capabilities may be part of one or more external devices such as a general purpose computer. In some embodiments, some or all of the memory 895 and controller/processor 890 can be in wireless or wired communication with the cytometer 810. The controller/processor 890 in conjunction with the memory 895 and the I/O 897 can be configured to perform various functions related to the preparation and analysis of a flow cytometer experiment.

The system illustrated in FIG. 8 includes six different photodetectors that detect fluorescent light in six different wavelength bands (which may be referred to herein as a "filter window" for a given photodetector) as defined by the configuration of filters and/or splitters in the beam path from the flow cell 825 to each photodetector. Different fluorescent molecules used for a flow cytometer experiment will emit light in their own characteristic wavelength bands. The particular fluorescent labels used for an experiment and their associated fluorescent emission bands may be selected to generally coincide with the filter windows of the photodetectors. The I/O 897 can be configured to receive data regarding a flow cytometer experiment having a panel of fluorescent labels and a plurality of cell populations having a plurality of markers, each cell population having a subset of the plurality of markers. The I/O 897 can also be configured to receive biological data assigning one or more markers to one or more cell populations, marker density data, emission spectrum data, data assigning labels to one or more markers, and cytometer configuration data. Flow cytometer experiment data, such as label spectral characteristics and flow cytometer configuration data can also be stored in the memory 895. The controller/processor 890 can be configured to evaluate one or more assignments of labels to markers.

In some embodiments, the subject systems are particle sorting systems that are configured to sort particles with an enclosed particle sorting module, such as those described in U.S. Patent Publication No. 2017/0299493, filed on Mar. 28, 2017, the disclosure of which is incorporated herein by reference. In certain embodiments, particles (e.g., cells) of the sample are sorted using a sort decision module having a plurality of sort decision units, such as those described in U.S. Patent Publication No. 2020/0256781, filed on Dec. 23, 2019, the disclosure of which is incorporated herein by reference. In some embodiments, systems for sorting components of a sample include a particle sorting module having deflection plates, such as described in U.S. Patent Publication No. 2017/0299493, filed on Mar. 28, 2017, the disclosure of which is incorporated herein by reference.

Figure 9:
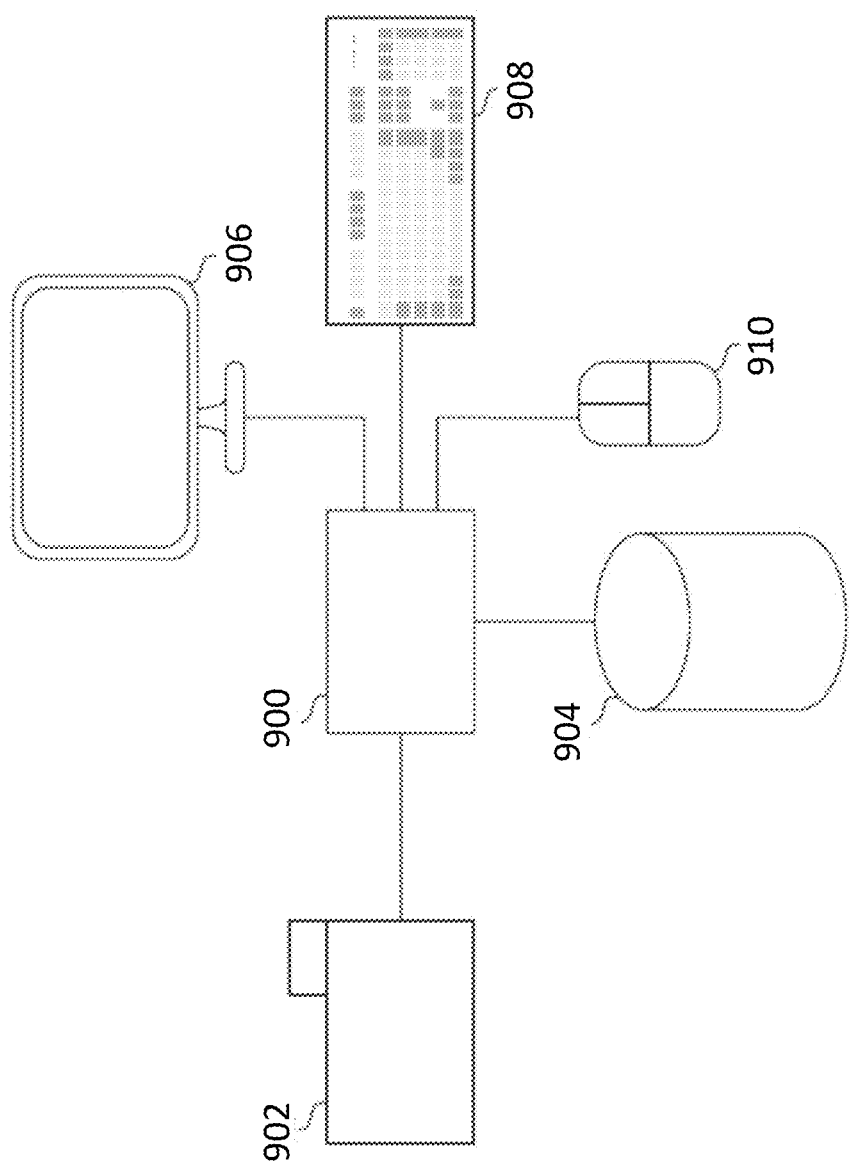
FIG. 9 depicts a sorting control system according to certain embodiments.

FIG. 9 shows a functional block diagram for one example of a sorting control system, such as a processor 900, for analyzing and displaying biological events. A processor 900 can be configured to implement a variety of processes for controlling graphic display of biological events.

A flow cytometer or sorting system 902 can be configured to acquire biological event data. For example, a flow cytometer can generate flow cytometric event data (e.g., particle-modulated light data). The flow cytometer 902 can be configured to provide biological event data to the processor 900. A data communication channel can be included between the flow cytometer 902 and the processor 900. The biological event data can be provided to the processor 900 via the data communication channel.

The processor 900 can be configured to receive biological event data from the flow cytometer 902. The biological event data received from the flow cytometer 902 can include flow cytometric event data. The processor 900 can be configured to provide a graphical display including a first plot of biological event data to a display device 906. The processor 900 can be further configured to render a region of interest as a gate around a population of biological event data shown by the display device 906, overlaid upon the first plot, for example. In some embodiments, the gate can be a logical combination of one or more graphical regions of interest drawn upon a single parameter histogram or bivariate plot. In some embodiments, the display can be used to display particle parameters or saturated photodetector data.

The processor 900 can be further configured to display the biological event data on the display device 906 within the gate differently from other events in the biological event data outside of the gate. For example, the processor 900 can be configured to render the color of biological event data contained within the gate to be distinct from the color of biological event data outside of the gate. The display device 906 can be implemented as a monitor, a tablet computer, a smartphone, or other electronic device configured to present graphical interfaces.

The processor 900 can be configured to receive a gate selection signal identifying the gate from a first input device. For example, the first input device can be implemented as a mouse 910. The mouse 910 can initiate a gate selection signal to the processor 900 identifying the gate to be displayed on or manipulated via the display device 906 (e.g., by clicking on or in the desired gate when the cursor is positioned there). In some implementations, the first device can be implemented as the keyboard 908 or other means for providing an input signal to the processor 900 such as a touchscreen, a stylus, an optical photodetector, or a voice recognition system. Some input devices can include multiple inputting functions. In such implementations, the inputting functions can each be considered an input device. For example, as shown in FIG. 9, the mouse 910 can include a right mouse button and a left mouse button, each of which can generate a triggering event.

The triggering event can cause the processor 900 to alter the manner in which the data is displayed, which portions of the data is actually displayed on the display device 906, and/or provide input to further processing such as selection of a population of interest for particle sorting.

In some embodiments, the processor 900 can be configured to detect when gate selection is initiated by the mouse 910. The processor 900 can be further configured to automatically modify plot visualization to facilitate the gating process. The modification can be based on the specific distribution of biological event data received by the processor 900. In some embodiments, the processor 900 expands the first gate such that a second gate is generated (e.g., as discussed above).

The processor 900 can be connected to a storage device 904. The storage device 904 can be configured to receive and store biological event data from the processor 900. The storage device 904 can also be configured to receive and store flow cytometric event data from the processor 900. The storage device 904 can be further configured to allow retrieval of biological event data, such as flow cytometric event data, by the processor 900.

The display device 906 can be configured to receive display data from the processor 900. The display data can comprise plots of biological event data and gates outlining sections of the plots. The display device 906 can be further configured to alter the information presented according to input received from the processor 900 in conjunction with input from the flow cytometer 902, the storage device 904, the keyboard 908, and/or the mouse 910.

In some implementations the processor 900 can generate a user interface to receive example events for sorting. For example, the user interface can include a mechanism for receiving example events or example images. The example events or images or an example gate can be provided prior to collection of event data for a sample or based on an initial set of events for a portion of the sample.

Figure 10A:
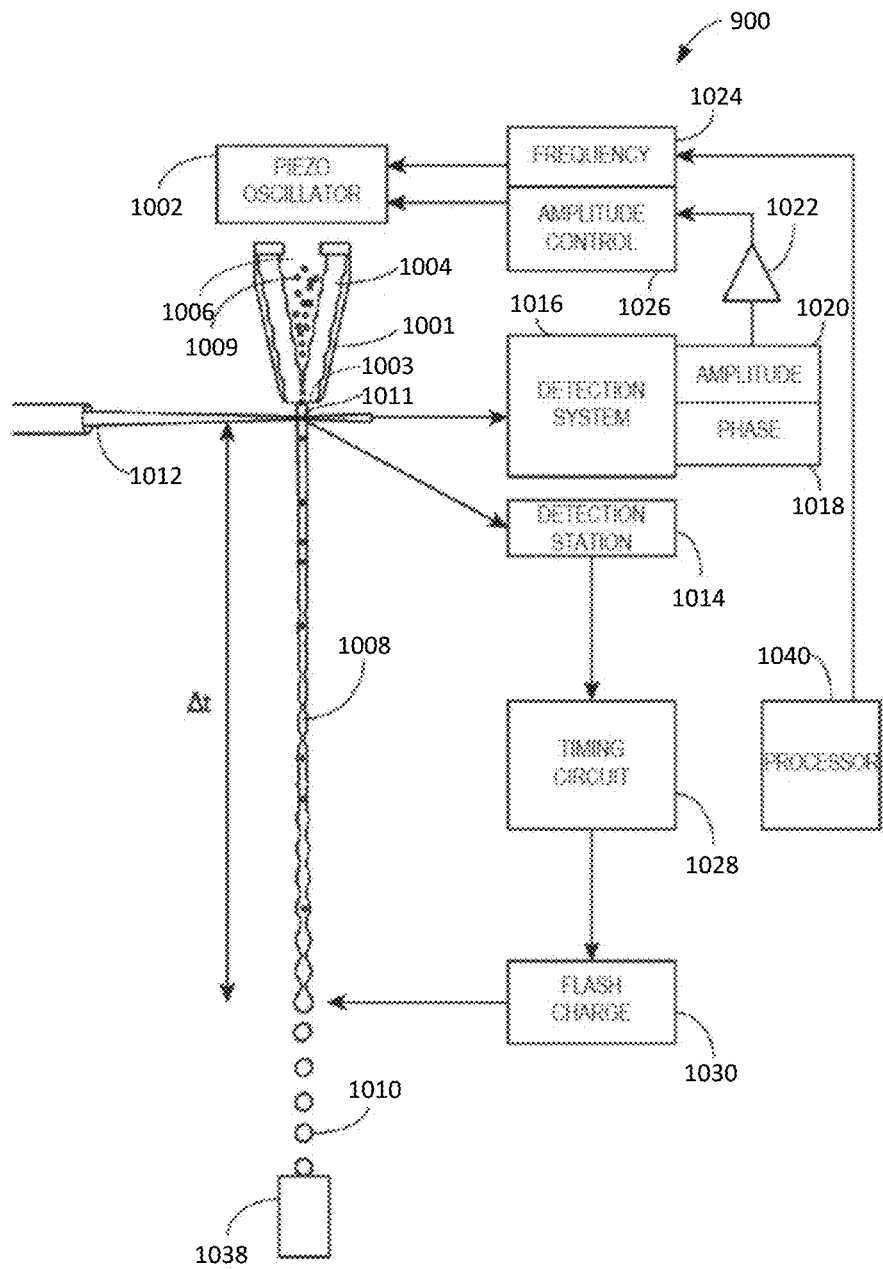
FIG. 10A-B depict a schematic drawing of a particle sorter system according to certain embodiments.

FIG. 10A is a schematic drawing of a particle sorter system 1000 (e.g., the flow cytometer 902) in accordance with one embodiment presented herein. In some embodiments, the particle sorter system 1000 is a cell sorter system. As shown in FIG. 10A, a drop formation transducer 1002 (e.g., piezo-oscillator) is coupled to a fluid conduit 1001, which can be coupled to, can include, or can be, a nozzle 1003. Within the fluid conduit 1001, sheath fluid 1004 hydrodynamically focuses a sample fluid 1006 comprising particles 1009 into a moving fluid column 1008 (e.g. a stream). Within the moving fluid column 1008, particles 1009 (e.g., cells) are lined up in single file to cross a monitored area 1011 (e.g., where laser-stream intersect), irradiated by an irradiation source 1012 (e.g., a laser). Vibration of the drop formation transducer 1002 causes moving fluid column 1008 to break into a plurality of drops 1010, some of which contain particles 1009.

In operation, a detection station 1014 (e.g., an event detector) identifies when a particle of interest (or cell of interest) crosses the monitored area 1011. Detection station 1014 feeds into a timing circuit 1028, which in turn feeds into a flash charge circuit 1030. At a drop break off point, informed by a timed drop delay (at), a flash charge can be applied to the moving fluid column 1008 such that a drop of interest carries a charge. The drop of interest can include one or more particles or cells to be sorted. The charged drop can then be sorted by activating deflection plates (not shown) to deflect the drop into a vessel such as a collection tube or a multi-well or microwell sample plate where a well or microwell can be associated with drops of particular interest. As shown in FIG. 10A, the drops can be collected in a drain receptacle 1038.

A detection system 1016 (e.g. a drop boundary detector) serves to automatically determine the phase of a drop drive signal when a particle of interest passes the monitored area 1011. An exemplary drop boundary detector is described in U.S. Pat. No. 7,679,039, which is incorporated herein by reference in its entirety. The detection system 1016 allows the instrument to accurately calculate the place of each detected particle in a drop. The detection system 1016 can feed into an amplitude signal 1020 and/or phase 1018 signal, which in turn feeds (via amplifier 1022) into an amplitude control circuit 1026 and/or frequency control circuit 1024. The amplitude control circuit 1026 and/or frequency control circuit 1024, in turn, controls the drop formation transducer 1002. The amplitude control circuit 1026 and/or frequency control circuit 1024 can be included in a control system.

In some implementations, sort electronics (e.g., the detection system 1016, the detection station 1014 and a processor 1040) can be coupled with a memory configured to store the detected events and a sort decision based thereon. The sort decision can be included in the event data for a particle. In some implementations, the detection system 1016 and the detection station 1014 can be implemented as a single detection unit or communicatively coupled such that an event measurement can be collected by one of the detection system 1016 or the detection station 1014 and provided to the non-collecting element.

Figure 10B:
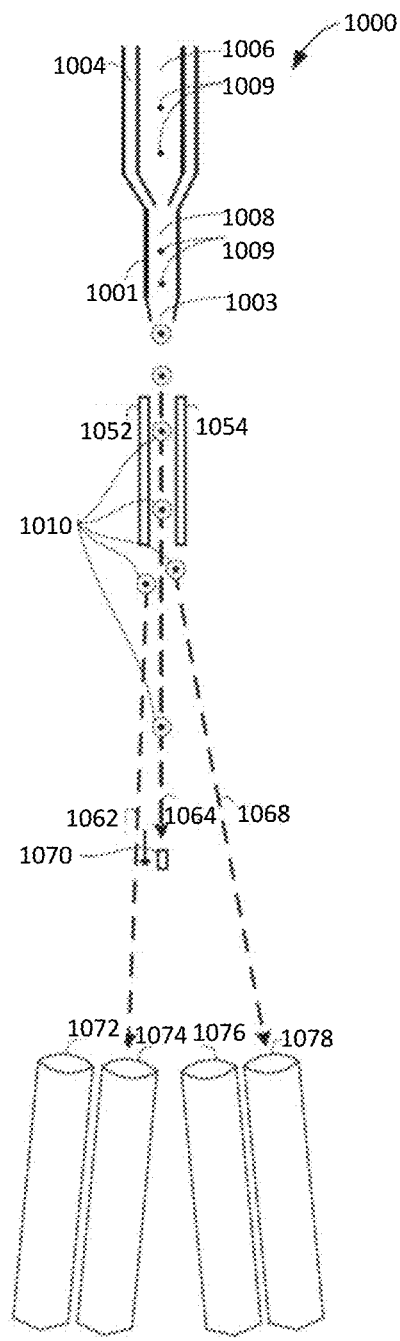

FIG. 10B is a schematic drawing of a particle sorter system, in accordance with one embodiment presented herein. The particle sorter system 1000 shown in FIG. 10B, includes deflection plates 1052 and 1054. A charge can be applied via a stream-charging wire in a barb. This creates a stream of droplets 1010 containing particles 1009 for analysis. The particles can be illuminated with one or more light sources (e.g., lasers) to generate light scatter and fluorescence information. The information for a particle is analyzed such as by sorting electronics or other detection system (not shown in FIG. 10B). The deflection plates 1052 and 1054 can be independently controlled to attract or repel the charged droplet to guide the droplet toward a destination collection vessel (e.g., one of 1072, 1074, 1076, or 1078). As shown in FIG. 10B, the deflection plates 1052 and 1054 can be controlled to direct a particle along a first path 1062 toward the vessel 1074 or along a second path 1068 toward the vessel 1078. If the particle is not of interest (e.g., does not exhibit scatter or illumination information within a specified sort range), deflection plates may allow the particle to continue along a flow path 1064. Such uncharged droplets may pass into a waste receptacle such as via aspirator 1070.

The sorting electronics can be included to initiate collection of measurements, receive fluorescence signals for particles, and determine how to adjust the deflection plates to cause sorting of the particles. Example implementations of the embodiment shown in FIG. 10B include the BD FACSAria™ line of flow cytometers commercially provided by Becton, Dickinson and Company (Franklin Lakes, NJ).

Methods of Analyzing a Sample

Aspects of the invention further include methods of analyzing a sample. Methods of interest include introducing a sample into a particle analysis system having a light source and one or more light detection modules. Light detection modules for use in the instant methods include a detection block having a photodetector and a clamp fitted on top of the detection block, where the clamp includes a flexure arm for applying an immobilizing force configured to immobilize the photodetector relative to the detection block, and the bottom of the flexure arm includes an opening for contacting the photodetector. Light detection modules may include any convenient number of photodetectors. In certain cases, the light detection modules include a single photodetector. In other cases, light detection modules include a plurality of photodetectors, such as where the number of photodetectors in the plurality of photodetectors ranges from 2 to 8, such as 2 to 6, and including 2 to 4. The particle analysis system may include any convenient number of light detection modules. In some instances, the system includes a single light detection module. In other embodiments, the light detection module includes a plurality of light detection modules, such as where the number of light detection modules in the plurality of light detection modules ranges from 2 to 8, such as 2 to 6.

In some instances, the sample analyzed in the instant methods is a biological sample. The term "biological sample" is used in its conventional sense to refer to a whole organism, plant, fungi or a subset of animal tissues, cells or component parts which may in certain instances be found in blood, mucus, lymphatic fluid, synovial fluid, cerebrospinal fluid, saliva, bronchoalveolar lavage, amniotic fluid, amniotic cord blood, urine, vaginal fluid and semen. As such, a "biological sample" refers to both the native organism or a subset of its tissues as well as to a homogenate, lysate or extract prepared from the organism or a subset of its tissues, including but not limited to, for example, plasma, serum, spinal fluid, lymph fluid, sections of the skin, respiratory, gastrointestinal, cardiovascular, and genitourinary tracts, tears, saliva, milk, blood cells, tumors, organs. Biological samples may be any type of organismic tissue, including both healthy and diseased tissue (e.g., cancerous, malignant, necrotic, etc.). In certain embodiments, the biological sample is a liquid sample, such as blood or derivative thereof, e.g., plasma, tears, urine, semen, etc., where in some instances the sample is a blood sample, including whole blood, such as blood obtained from venipuncture or fingerstick (where the blood may or may not be combined with any reagents prior to assay, such as preservatives, anticoagulants, etc.).

In certain embodiments the source of the sample is a "mammal" or "mammalian", where these terms are used broadly to describe organisms which are within the class Mammalia, including the orders carnivore (e.g., dogs and cats), Rodentia (e.g., mice, guinea pigs, and rats), and primates (e.g., humans, chimpanzees, and monkeys). In some instances, the subjects are humans. The methods may be applied to samples obtained from human subjects of both genders and at any stage of development (i.e., neonates, infant, juvenile, adolescent, adult), where in certain embodiments the human subject is a juvenile, adolescent or adult. While the present invention may be applied to samples from a human subject, it is to be understood that the methods may also be carried-out on samples from other animal subjects (that is, in "non-human subjects") such as, but not limited to, birds, mice, rats, dogs, cats, livestock and horses. Cells of interest may be targeted for characterized according to a variety of parameters, such as a phenotypic characteristic identified via the attachment of a particular fluorescent label to cells of interest. In some embodiments, the system is configured to deflect analyzed droplets that are determined to include a target cell. A variety of cells may be characterized using the subject methods. Target cells of interest include, but are not limited to, stem cells, T cells, dendritic cells, B Cells, granulocytes, leukemia cells, lymphoma cells, virus cells (e.g., HIV cells), NK cells, macrophages, monocytes, fibroblasts, epithelial cells, endothelial cells, and erythroid cells. Target cells of interest include cells that have a convenient cell surface marker or antigen that may be captured or labelled by a convenient affinity agent or conjugate thereof. For example, the target cell may include a cell surface antigen such as CD11b, CD123, CD14, CD15, CD16, CD19, CD193, CD2, CD25, CD27, CD3, CD335, CD36, CD4, CD43, CD45RO, CD56, CD61, CD7, CD8, CD34, CD1c, CD23, CD304, CD235a, T cell receptor alpha/beta, T cell receptor gamma/delta, CD253, CD95, CD20, CD105, CD117, CD120b, Notch4, Lgr5 (N-Terminal), SSEA-3, TRA-1-60 Antigen, Disialoganglioside GD2 and CD71. In some embodiments, the target cell is selected from HIV containing cell, a Treg cell, an antigen-specific T-cell populations, tumor cells or hematopoietic progenitor cells (CD34+) from whole blood, bone marrow or cord blood.

In practicing the subject methods, a sample (e.g., in a flow stream of a flow cytometer) is irradiated with light from a light source. In some embodiments, the light source is a broadband light source, emitting light having a broad range of wavelengths, such as for example, spanning 50 nm or more, such as 100 nm or more, such as 150 nm or more, such as 200 nm or more, such as 250 nm or more, such as 300 nm or more, such as 350 nm or more, such as 400 nm or more and including spanning 500 nm or more. For example, one suitable broadband light source emits light having wavelengths from 200 nm to 1500 nm. Another example of a suitable broadband light source includes a light source that emits light having wavelengths from 400 nm to 1000 nm. Where methods include irradiating with a broadband light source, broadband light source protocols of interest may include, but are not limited to, a halogen lamp, deuterium arc lamp, xenon arc lamp, stabilized fiber-coupled broadband light source, a broadband LED with continuous spectrum, superluminescent emitting diode, semiconductor light emitting diode, wide spectrum LED white light source, an multi-LED integrated white light source, among other broadband light sources or any combination thereof.

In other embodiments, methods includes irradiating with a narrow band light source emitting a particular wavelength or a narrow range of wavelengths, such as for example with a light source which emits light in a narrow range of wavelengths like a range of 50 nm or less, such as 40 nm or less, such as 30 nm or less, such as 25 nm or less, such as 20 nm or less, such as 15 nm or less, such as 10 nm or less, such as 5 nm or less, such as 2 nm or less and including light sources which emit a specific wavelength of light (i.e., monochromatic light). Where methods include irradiating with a narrow band light source, narrow band light source protocols of interest may include, but are not limited to, a narrow wavelength LED, laser diode or a broadband light source coupled to one or more optical bandpass filters, diffraction gratings, monochromators or any combination thereof.

In certain embodiments, methods include irradiating the sample with one or more lasers. As discussed above, the type and number of lasers will vary depending on the sample as well as desired light collected and may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In other instances, the methods include irradiating the flow stream with a dye laser, such as a stilbene, coumarin or rhodamine laser. In yet other instances, methods include irradiating the flow stream with a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, methods include irradiating the flow stream with a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof.

The sample may be irradiated with one or more of the above mentioned light sources, such as 2 or more light sources, such as 3 or more light sources, such as 4 or more light sources, such as 5 or more light sources and including 10 or more light sources. The light source may include any combination of types of light sources. For example, in some embodiments, the methods include irradiating the sample in the flow stream with an array of lasers, such as an array having one or more gas lasers, one or more dye lasers and one or more solid-state lasers.

The sample may be irradiated with wavelengths ranging from 200 nm to 1500 nm, such as from 250 nm to 1250 nm, such as from 300 nm to 1000 nm, such as from 350 nm to 900 nm and including from 400 nm to 800 nm. For example, where the light source is a broadband light source, the sample may be irradiated with wavelengths from 200 nm to 900 nm. In other instances, where the light source includes a plurality of narrow band light sources, the sample may be irradiated with specific wavelengths in the range from 200 nm to 900 nm. For example, the light source may be plurality of narrow band LEDs (1 nm-25 nm) each independently emitting light having a range of wavelengths between 200 nm to 900 nm. In other embodiments, the narrow band light source includes one or more lasers (such as a laser array) and the sample is irradiated with specific wavelengths ranging from 200 nm to 700 nm, such as with a laser array having gas lasers, excimer lasers, dye lasers, metal vapor lasers and solid-state laser as described above.

Where more than one light source is employed, the sample may be irradiated with the light sources simultaneously or sequentially, or a combination thereof. For example, the sample may be simultaneously irradiated with each of the light sources. In other embodiments, the flow stream is sequentially irradiated with each of the light sources. Where more than one light source is employed to irradiate the sample sequentially, the time each light source irradiates the sample may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, methods may include irradiating the sample with the light source (e.g. laser) for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to 10 microseconds. In embodiments where sample is sequentially irradiated with two or more light sources, the duration sample is irradiated by each light source may be the same or different. The time period between irradiation by each light source may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. For example, the time period between irradiation by each light source may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to 10 microseconds. In certain embodiments, the time period between irradiation by each light source is 10 microseconds. In embodiments where sample is sequentially irradiated by more than two (i.e., 3 or more) light sources, the delay between irradiation by each light source may be the same or different.

The sample may be irradiated continuously or in discrete intervals. In some instances, methods include irradiating the sample in the sample with the light source continuously. In other instances, the sample in is irradiated with the light source in discrete intervals, such as irradiating every 0.001 millisecond, every 0.01 millisecond, every 0.1 millisecond, every 1 millisecond, every 10 milliseconds, every 100 milliseconds and including every 1000 milliseconds, or some other interval.

Depending on the light source, the sample may be irradiated from a distance which varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, the angle or irradiation may also vary, ranging from 10° to 90°, such as from 15° to 85°, such as from 20° to 80°, such as from 25° to 75° and including from 30° to 60°, for example at a 90° angle.

As discussed above, in embodiments light from the irradiated sample is conveyed to a light detection system as described herein and measured by one or more photodetectors. In practicing the subject methods, light from the sample is conveyed to three or more wavelength separators that are each configured to pass light having a predetermined spectral range. The spectral ranges of light from each of the wavelength separators are conveyed to one or more light detection modules having optical components that are configured to convey light having a predetermined sub-spectral range to the photodetectors.

Light may be measured with the light detection systems continuously or in discrete intervals. In some instances, methods include taking measurements of the light continuously. In other instances, the light is measured in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

Measurements of the collected light may be taken one or more times during the subject methods, such as 2 or more times, such as 3 or more times, such as 5 or more times and including 10 or more times. In certain embodiments, the light propagation is measured 2 or more times, with the data in certain instances being averaged.

In some embodiments, methods include adjusting the light before detecting the light with the subject light detection systems. For example, the light from the sample source may be passed through one or more lenses, mirrors, pinholes, slits, gratings, light refractors, and any combination thereof. In some instances, the collected light is passed through one or more focusing lenses, such as to reduce the profile of the light directed to the light detection system or optical collection system as described above. In other instances, the emitted light from the sample is passed through one or more collimators to reduce light beam divergence conveyed to the light detection system.

Methods of interest may further include employing particles in research, laboratory testing, or therapy. In some embodiments, the subject methods include obtaining individual cells prepared from a target fluidic or tissue biological sample. For example, the subject methods include obtaining cells from fluidic or tissue samples to be used as a research or diagnostic specimen for diseases such as cancer. Likewise, the subject methods include obtaining cells from fluidic or tissue samples to be used in therapy. A cell therapy protocol is a protocol in which viable cellular material including, e.g., cells and tissues, may be prepared and introduced into a subject as a therapeutic treatment. Conditions that may be treated by the administration of the flow cytometrically sorted sample include, but are not limited to, blood disorders, immune system disorders, organ damage, etc.

A typical cell therapy protocol may include the following steps: sample collection, cell isolation, genetic modification, culture, and expansion in vitro, cell harvesting, sample volume reduction and washing, bio-preservation, storage, and introduction of cells into a subject. The protocol may begin with the collection of viable cells and tissues from source tissues of a subject to produce a sample of cells and/or tissues. The sample may be collected via any suitable procedure that includes, e.g., administering a cell mobilizing agent to a subject, drawing blood from a subject, removing bone marrow from a subject, etc. After collecting the sample, cell enrichment may occur via several methods including, e.g., centrifugation based methods, filter based methods, elutriation, magnetic separation methods, fluorescence-activated cell sorting (FACS), and the like. In some cases, the enriched cells may be genetically modified by any convenient method, e.g., nuclease mediated gene editing. The genetically modified cells can be cultured, activated, and expanded in vitro. In some cases, the cells are preserved, e.g., cryopreserved, and stored for future use where the cells are thawed and then administered to a patient, e.g., the cells may be infused in the patient.

Methods of Assembling a Light Detection Module

Aspects of the disclosure further include methods of assembling a light detection module. Methods of interest include positioning a photodetector in a detection block and attaching to the detection block a clamp comprising a flexure arm of applying an immobilizing force to the photodetector to assemble the light detection module. Methods include positioning any convenient number of photodetectors within the light detection module. In some instances, methods include positioning a single photodetector within the light detection module. In other instances, methods include positioning a plurality of photodetectors within the light detection module, such as where the number of photodetectors in the plurality of photodetectors ranges from 2 to 8, such as 2 to 6 and including 2 to 4.

Aspects of the subject methods include positioning the clamp on the top of the detection block to assemble the light detection module. In certain instances, the clamp includes an alignment key and the detection block includes a correspondingly sized recess. In such instances, assembling the light detection module includes engaging the alignment key in a mating relationship with the recess.

Photodetectors of interest in the subject methods may include leads protruding therefrom. Embodiments of the methods consequently include attaching the clamp without adjusting (e.g., detaching) the leads from the photodetector and/or a printed circuit board. The flexure arm of the clamp may, in certain cases, include a u-shaped opening configured to apply the immobilizing force to a lip component of the photodetector. When the clamp is positioned on the detector block, the u-shaped opening may accommodate the leads.

Methods of interest additionally include securing the clamp to the detection block via an attachment mechanism. In some cases, the attachment mechanism includes a passage configured to receive a screw. The clamp may include any convenient number of passages. In some embodiments, the clamp includes a single passage. In other embodiments, the clamp includes a plurality of passages, such as where the number of passages ranges from 2 to 3 passages, including 2 to 3 passages. In some embodiments, the clamp includes 2 passages. In such embodiments, methods include securing the detection block via one or more screws.

In other cases, the attachment mechanism includes one or more clips. Clips of interest may include a protrusion from the clamp that is configured to engage in a mating relationship with a complementarily sized groove in the detection module. Where the clamp includes a clip, the clip may be configured to engage the groove as the clamp is positioned on the detection module and, once engaged, prevent the clamp from being lifted off the detection module. The subject clamps may include any convenient number of clips. In some instances, the clamps include a single clip configured to mate with a single groove in the detection module. In additional embodiments, the clamp includes a plurality of clips, such as where the number of clips ranges from 2 to 4. Accordingly, where the subject clamps include one or more clips, methods include positioning the clamp of the detection block such that the clips engage with the grooves.

Computer Controlled Systems

Aspects of the present disclosure further include computer-controlled systems, where the systems include one or more computers for complete automation or partial automation. In some embodiments, systems include a computer having a non-transitory computer readable storage medium with a computer program stored thereon, where the computer program when loaded on the computer includes instructions for analyzing data from one or more clamped photodetectors (e.g., photodetectors in a light detection module).

In embodiments, the system includes an input module, a processing module, and an output module. The subject systems may include both hardware and software components, where the hardware components may take the form of one or more platforms, e.g., in the form of servers, such that the functional elements, i.e., those elements of the system that carry out specific tasks (such as managing input and output of information, processing information, etc.) of the system may be carried out by the execution of software applications on and across the one or more computer platforms represented of the system.

Systems may include a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor, or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, Python, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques. In some embodiments, the processor includes analog electronics which provide feedback control, such as for example negative feedback control.

The system memory may be any of a variety of known or future memory storage devices. Examples include any commonly available random access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, or a diskette drive. Such types of memory storage devices typically read from, and/or write to, a program storage medium (not shown) such as a compact disk. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid-state storage devices (including magnetic or optical disks or tape or RAM, or any other suitable device, either fixed or portable). The processor may include a general-purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, Wi-Fi, infrared, wireless Universal Serial Bus (USB), Ultra Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, a USB-C port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or Wi-Fi connection to the internet at a Wi-Fi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a workstation, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows® NT®, Windows® XP, Windows® 7, Windows® 8, Windows® 10, iOS®, macOS®, Linux®, Ubuntu®, Fedora®, OS/400®, i5/OS®, IBM i®, Android™, SGI IRIX®, Oracle Solaris® and others.

Figure 11:
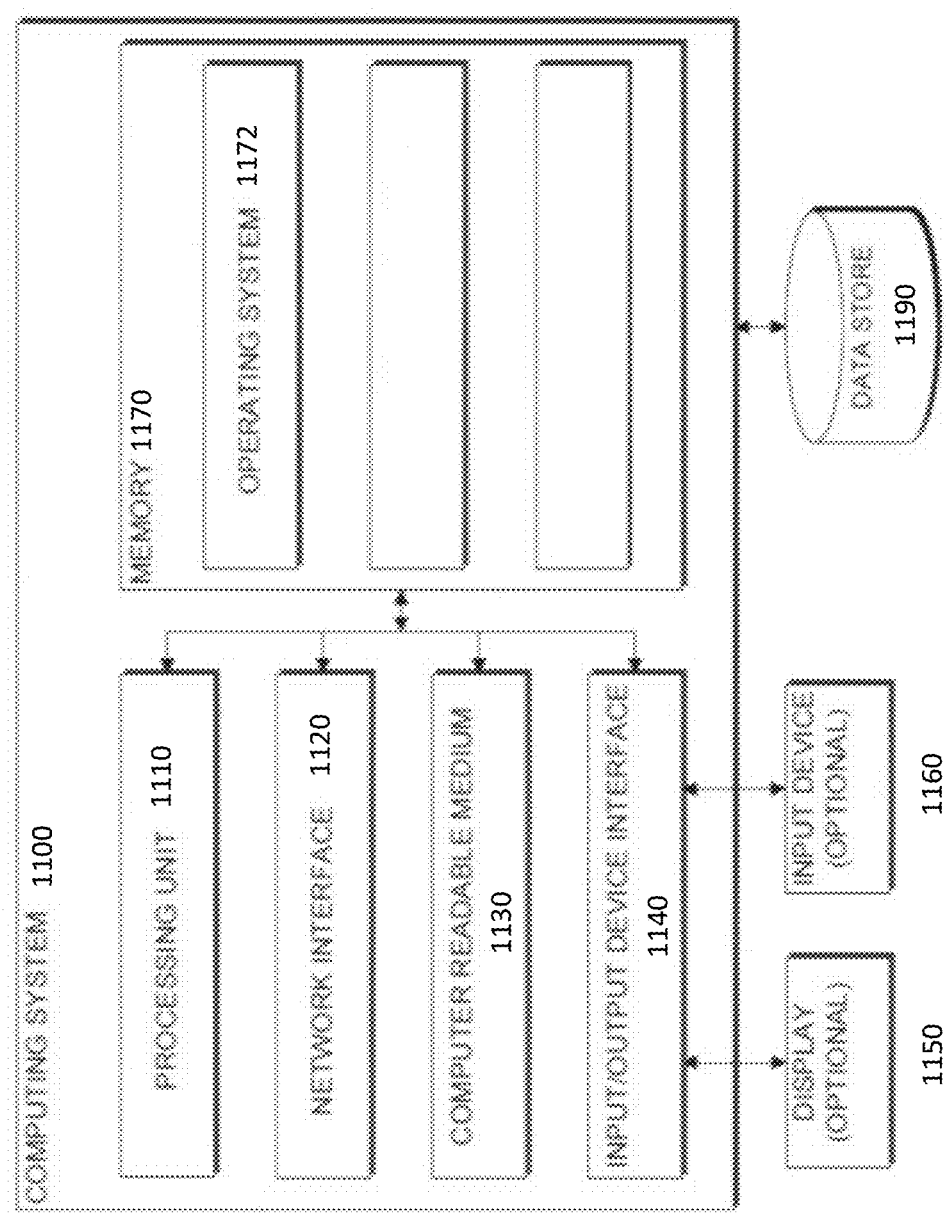
FIG. 11 depicts a block diagram of a computing system according to certain embodiments.

FIG. 11 depicts a general architecture of an example computing device 1100 according to certain embodiments. The general architecture of the computing device 1100 depicted in FIG. 11 includes an arrangement of computer hardware and software components. It is not necessary, however, that all of these generally conventional elements be shown in order to provide an enabling disclosure. As illustrated, the computing device 1100 includes a processing unit 1110, a network interface 1120, a computer readable medium drive 1130, an input/output device interface 1140, a display 1150, and an input device 1160, all of which may communicate with one another by way of a communication bus. The network interface 1120 may provide connectivity to one or more networks or computing systems. The processing unit 1110 may thus receive information and instructions from other computing systems or services via a network. The processing unit 1110 may also communicate to and from memory 1170 and further provide output information for an optional display 1150 via the input/output device interface 1140. For example, an analysis software (e.g., data analysis software or program such as FlowJo®) stored as executable instructions in the non-transitory memory of the analysis system can display the flow cytometry event data to a user. The input/output device interface 1140 may also accept input from the optional input device 1160, such as a keyboard, mouse, digital pen, microphone, touch screen, gesture recognition system, voice recognition system, gamepad, accelerometer, gyroscope, or other input device.

The memory 1170 may contain computer program instructions (grouped as modules or components in some embodiments) that the processing unit 1110 executes in order to implement one or more embodiments. The memory 1170 generally includes RAM, ROM and/or other persistent, auxiliary or non-transitory computer-readable media. The memory 1170 may store an operating system 1172 that provides computer program instructions for use by the processing unit 1110 in the general administration and operation of the computing device 1100. Data may be stored in data storage device 1190. The memory 1170 may further include computer program instructions and other information for implementing aspects of the present disclosure.

Utility

The subject light detection systems find use where the characterization of a sample by optical properties, in particular where low levels of light are collected, is desired. In some embodiments, the systems and methods described herein find use in flow cytometry characterization of biological samples labelled with fluorescent tags. In other embodiments, the systems and methods find use in spectroscopy of transmitted or scattered light. In addition, the subject systems and methods find use in increasing the obtainable signal from light collected from a sample (e.g., in a flow stream). In certain instances, the present disclosure finds use in enhancing measurement of light collected from a sample that is irradiated in a flow stream in a flow cytometer. For example, the present invention may be employed to reduce noise caused by undesirable movement of photodetectors during operation. Embodiments of the present disclosure find use where enhancing the effectiveness of emission measurements in flow cytometry are desired, such as in research and high throughput laboratory testing. The present disclosure also finds use where it is desirable to provide a flow cytometer with improved cell sorting accuracy, enhanced particle collection, reduced energy consumption, particle charging efficiency, more accurate particle charging and enhanced particle deflection during cell sorting.

The present disclosure may additionally find use in increasing the ease with which a particle analyzer may be assembled. As compared to traditional solutions for immobilizing a photodetector (e.g., such as those discussed in the Introduction section), the clamps, systems and methods described herein may be used to immobilize a photodetector without damaging the photodetector or adjusting the leads protruding therefrom. As such, embodiments of the invention may promote ease of use and increase the quality of flow cytometer.

Embodiments of the invention find use in applications where cells prepared from a biological sample may be desired for research, laboratory testing or for use in therapy. In some embodiments, the subject methods and devices may facilitate obtaining individual cells prepared from a target fluidic or tissue biological sample. For example, the subject methods and systems facilitate obtaining cells from fluidic or tissue samples to be used as a research or diagnostic specimen for diseases such as cancer. Likewise, the subject methods and systems may facilitate obtaining cells from fluidic or tissue samples to be used in therapy. Methods and devices of the present disclosure allow for separating and collecting cells from a biological sample (e.g., organ, tissue, tissue fragment, fluid) with enhanced efficiency and low cost as compared to traditional flow cytometry systems.

Kits

Aspects of the invention further include kits, where kits include one or more clamps for applying an immobilizing force to one or more photodetectors in a light detection module. Clamps of interest include one or more flexure arms, such as flexure arms that include a raised portion on an inner surface for contacting the photodetector and applying the immobilizing force. Clamps in the subject kits may include any convenient number of flexure arms. In some embodiments, the clamps include a single flexure arm. In other embodiments, the clamps include a plurality of flexure arms, such as where the number of flexure arms in the plurality of flexure arms ranges from 2 to 8, such as 2 to 6 and including 2 to 4.

In addition to the above components, the subject kits may further include (in certain embodiments) one or more wavelength separators, a plurality of photodetectors and one or more optical components (e.g., dichroic mirrors, beam splitters, collimating lenses, etc.). In some embodiments, kits include a substrate for co-mounting a wavelength separator with an optical component and a photodetector. In certain embodiments, kits include one or more fasteners for assembling together components of the subject light detection systems. Kits may also include an optical collection component, such as fiber optics (e.g., fiber optics relay bundle) or components for a free-space relay system. In some instances, kits further include one or more photodetectors, such as avalanche photodiodes.

In addition to the above components, the subject kits may further include (in some embodiments) instructions, e.g., for installing the plugin to the existing software package. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

Although the foregoing invention has been described in some detail by way of illustration and example for purposes of clarity of understanding, it is readily apparent to those of ordinary skill in the art in light of the teachings of this invention that some changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112(6) is not invoked.

What is claimed is:

1. A system comprising:
   a light source; and
   a light detection module comprising:
      a detection block comprising a photodetector, wherein the photodetector comprises leads; and
      a clamp fitted on top of the detection block, wherein:
         the clamp comprises a flexure arm for applying an immobilizing force configured to immobilize the photodetector relative to the detection block;
         the bottom of the flexure arm comprises an opening for contacting the photodetector, wherein the opening is a u-shaped opening configured to apply the immobilizing force to a lip component of the photodetector, wherein the leads pass through the u-shaped opening; and
      the clamp comprises a wall, wherein:
         the wall is positioned on an opposite side of the clamp relative to the flexure arm;
         the wall extends in a direction that is substantially parallel to the flexure arm;
         the wall is configured to contact the opposite side of the detection block as compared to the flexure arm; and
         the wall is in direct contact with a surface of the photodetector.

2. The system according to claim 1, wherein the flexure arm comprises a raised portion on an inner surface.

3. The system according to claim 1, wherein the detection block comprises a plurality of photodetectors.

4. The system according to claim 1, wherein the clamp comprises a plurality of flexure arms.

5. The system according to claim 1, wherein the clamp further comprises an aperture configured to allow the passage of light through the wall of the clamp for detection.

6. The system according to claim 1, wherein the light detection module further comprises an elongated electrical component.

7. The system according to claim 6, wherein the clamp further comprises a flexure tab positioned on an inner surface of the clamp for applying an immobilizing force to the elongated electrical component.

8. The system according to claim 6, wherein the elongated electrical component is a thermistor.

9. The system according to claim 1, wherein the clamp further comprises an attachment mechanism for securing the clamp to the light detection module.

10. The system according to claim 1, wherein the clamp further comprises an alignment key for positioning the clamp onto the light detection module by engaging in a mating relationship with a recess in a light detection module.

11. The system according to claim 1, further comprising a thermoelectric cooler in contact with a bottom surface of the detection block.

12. The system according to claim 1, further comprising an optical collection system comprising fiber optics for propagating light to the light detection module.

13. The system according to claim 1, further comprising three or more wavelength separators that are each configured to pass light having a predetermined spectral range.

14. The system according to claim 1, wherein the light detection module further comprises an optical component configured to convey light having a predetermined sub-spectral range for detection.

15. The system according to claim 14, wherein the optical component comprises a dichroic mirror.

16. The system according to claim 1, wherein the system comprises a plurality of light detection modules.

17. The system according to claim 1, further comprising a printed circuit board.

18. The system according to claim 17, wherein the leads connect the printed circuit board to the photodetector.

19. The system according to claim 1, wherein the system is a particle analyzer.

20. The system according to claim 1, wherein the photodetector is an avalanche photodiode.

* * * * *